United States Patent
Parrinello et al.

(10) Patent No.: US 7,425,293 B2
(45) Date of Patent: Sep. 16, 2008

(54) METHOD FOR FORMING ARTICLES BY COMPRESSION MOULDING

(75) Inventors: Fiorenzo Parrinello, Medicina (IT); Alessandro Balboni, Granarolo Dell'Emilia (IT); Zeno Zuffa, Borgo Tossingnano (IT)

(73) Assignee: Sacmi Cooperativa Meccanici Imola Soc. Coop. A.R.L., Imola (IT)

( * ) Notice: Subject to any disclaimer, the term of this patent is extended or adjusted under 35 U.S.C. 154(b) by 328 days.

(21) Appl. No.: 10/461,392

(22) Filed: Jun. 16, 2003

(65) Prior Publication Data

US 2004/0166193 A1 Aug. 26, 2004

(30) Foreign Application Priority Data

Jan. 20, 2003 (IT) .......................... RE2003A0005

(51) Int. Cl.
*B29C 43/20* (2006.01)
*B29C 70/80* (2006.01)

(52) U.S. Cl. .................. 264/255; 264/247; 264/268; 264/275; 264/320

(58) Field of Classification Search ............ 264/255, 264/246, 268, 320, 275
See application file for complete search history.

(56) References Cited

U.S. PATENT DOCUMENTS

| | | | | |
|---|---|---|---|---|
| 3,060,608 A | * | 10/1962 | Stahmann | 428/36.1 |
| 3,184,527 A | * | 5/1965 | Fischer | 264/255 |
| 4,076,788 A | * | 2/1978 | Ditto | 264/255 |
| 4,385,955 A | * | 5/1983 | Doerfling et al. | 156/245 |
| 4,674,642 A | * | 6/1987 | Towns et al. | 215/230 |
| 4,783,298 A | * | 11/1988 | Oda | 264/155 |
| 5,419,864 A | * | 5/1995 | Sheer et al. | 264/254 |

(Continued)

FOREIGN PATENT DOCUMENTS

| | | | |
|---|---|---|---|
| JP | 56-164834 | * | 12/1981 |
| WO | WO 02/68171 | * | 6/2002 |

*Primary Examiner*—Edmund H. Lee
(74) *Attorney, Agent, or Firm*—Browdy and Neimark

(57) ABSTRACT

Method for forming articles of synthetic material by compression moulding, comprising the following operative stages: inserting a first measured quantity of synthetic material in the plastic state into the cavity of a mould comprising a punch with which it defines a first forming chamber for said measured quantity; pressing said measured quantity to obtain a first portion of the article; opening the mould and inserting a second measured quantity into said cavity; closing the mould by repositioning the punch relative to said cavity to define a second forming chamber; pressing said second measured quantity and again opening the mould, then extracting said article from the punch.

The method is implemented by a plant comprising a plurality of forming units (3), and at least one device (5', 5") for feeding in succession at least two measured quantities (100, 201) of synthetic material in the plastic state to each of said forming units (3, 43, 81), each of said forming units comprising an upper half-mould provided with at least one punch (110, 46) and a lower half-mould comprising at least one die (29, 70, 90, 91) provided with a cavity matching said at least one punch (110, 46), means being provided to align said at least one die with said at least one punch in succession and to drive said die along the alignment axis, and means which collaborate with said at least one punch and said at least one die in such a manner as to define at least two different forming chambers.

6 Claims, 34 Drawing Sheets

U.S. PATENT DOCUMENTS

| | | | |
|---|---|---|---|
| 5,676,901 A * | 10/1997 | Higashi et al. | 264/255 |
| 5,786,079 A * | 7/1998 | Alieri | 425/349 |
| 6,306,330 B1 * | 10/2001 | Cerny | 264/255 |
| 6,656,406 B2 * | 12/2003 | Parrinello | 264/268 |
| 7,022,277 B2 * | 4/2006 | Bosshardt et al. | 264/242 |

* cited by examiner

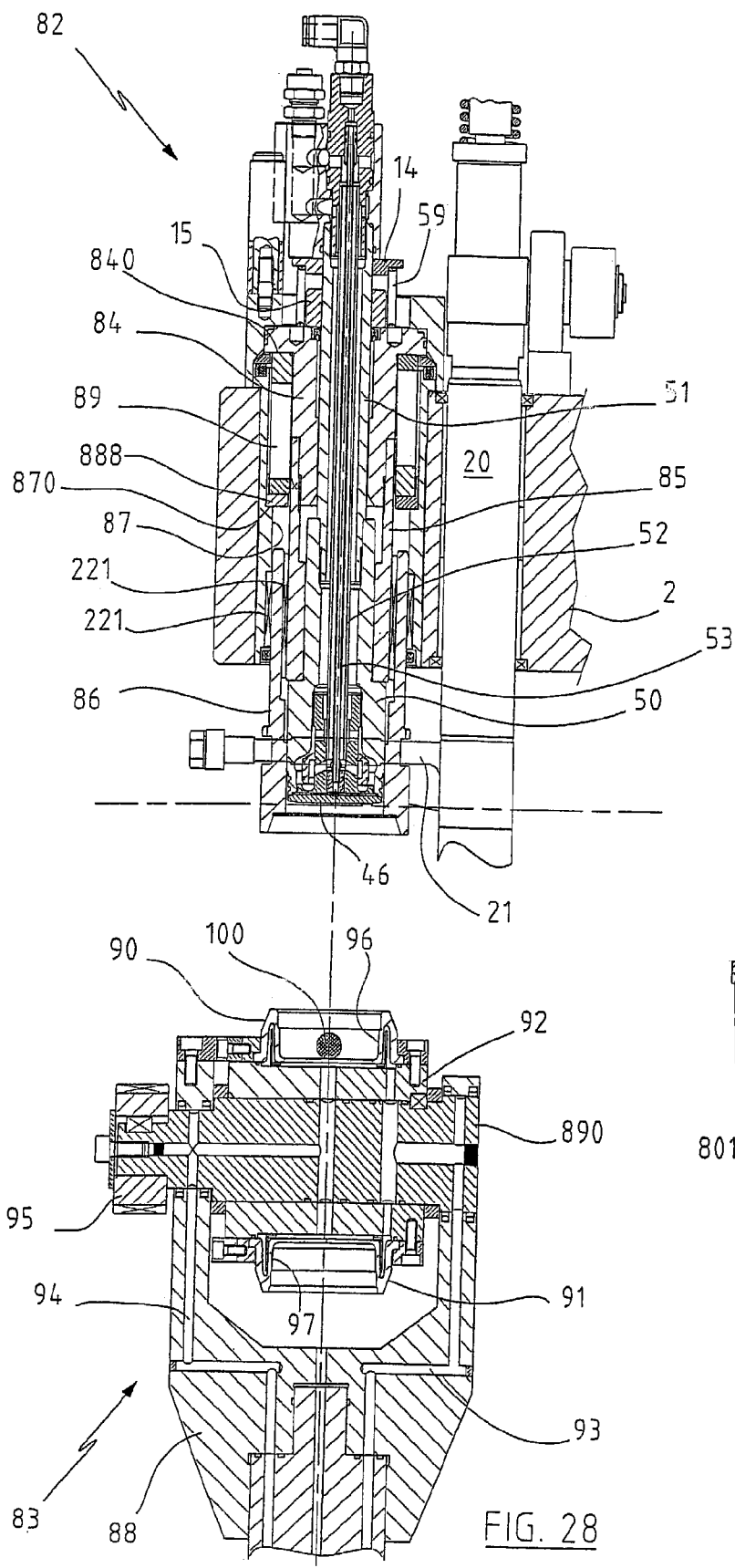
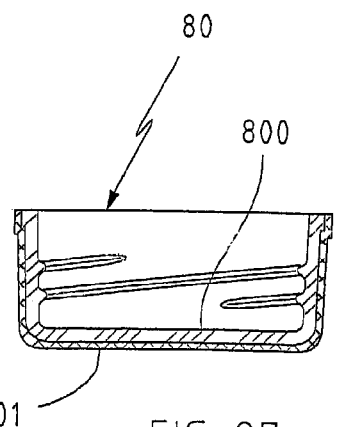
FIG. 27
FIG. 28

METHOD FOR FORMING ARTICLES BY COMPRESSION MOULDING

This invention relates to a method and the relative plant for forming articles of synthetic material by compression moulding. It relates in particular to the forming of large-thickness articles or alternatively articles comprising at least two different materials which may have different technical characteristics.

Plants based on injection moulding technology are known enabling articles to be formed comprising at least two material portions of different characteristics.

The most recent type of injection moulding plants, namely the horizontal turntable type, comprises two opposing dies provided with cavities, and at least one punch to be inserted in succession into the cavities of each of the two dies to define two different product forming chambers, into which the materials are fed.

Although the said plants perform the functions for which they are proposed, they present the intrinsic limits of injection moulding. The object of this invention is to obtain a product of large thickness and/or composed of portions of different materials by compression moulding. The invention attains said object by providing a method for forming articles of synthetic material by compression moulding which comprises at least the following operative stages:

a) feeding a first measured quantity of synthetic material in the plastic state into the cavity of a mould comprising at least one punch which when inserted into said cavity defines at least one forming chamber for said measured quantity, b) pressing said measured quantity by inserting the punch into the cavity to obtain a first portion of the product, c) opening the mould by withdrawing the punch, with which the first product portion remains rigid, and feeding a second measured quantity into said cavity, d) repositioning the punch and the relative first pressed portion in said at least one cavity to define a second forming chamber between said cavity and said first portion, e) pressing said second measured quantity to obtain a second product portion, f) again opening the mould, and g) extracting said product.

According to the method of the invention, the number of measured quantities fed in succession into the cavity, and hence the number of pressings executed to obtain the final product, vary according to the type of product. Hence stages c), d), e) can be repeated a number of times equal to the number of constituent portions of the product to be obtained.

This method is preferably implemented by a forming plant comprising a rotary turntable for compression moulding composed of a support element which rotates about a central vertical axis.

A plurality of compression moulding units are mounted on the support element equidistant from each other and from the axis of said turntable.

Each of said units comprises an upper punch with which there is associated at least one lower die provided with a cavity into which the measured quantity or pellet of synthetic material to be pressed is deposited.

Said at least one punch and at least one die mutually cooperate to define the various forming chambers.

Means are provided for driving said support elements such that each unit undergoes a path comprising a first pellet loading region, a first moulding region, a first cooling region, a second loading region, a second moulding region, a second cooling region and a discharge region for the moulded article.

Means are provided for moving said punches and said cavities relative to each other during the rotation of the support element.

In a first embodiment of the invention, each of said units comprises one punch and one die, of variable geometry, and means for varying the relative position of said punch and said die in order to define a number of forming chambers based on the number of constituent portions of the final product.

In a different embodiment of the invention, each of said units comprises at least one punch and a number of dies equal to the number of constituent portions of the final product. In this case means are provided for associating the punch with the correct die at any given time.

Specifically, in this embodiment said means for associating the punch with the correct die at any given time comprise a die support shaft which can rotate about a horizontal axis perpendicular to the axis of rotation of the turntable. According to a first variant, said means comprise a die support slide which can translate in a direction radial to the axis of rotation of said turntable.

Finally in a further variant, said means comprise a die support plate which can rotate about an axis parallel to the turntable axis.

From the description it is apparent that by virtue of the method and plant of the invention, products comprising portions of materials which differ from each other by at least one characteristic can be advantageously form compression moulding.

Moreover by virtue of the method of the invention, large-thickness products of synthetic material can be formed by double pressing identical materials. In this case the advantage consists in a decrease in the time required to cool the product, and hence the total product production time. In this respect the cooling time varies with the square of the product thickness, hence for the same final product thickness, if the product is formed by double pressing, the time required to cool the product is one half of the time required to cool the same product of the same thickness obtained by a single pressing.

In other embodiments of the invention, a rotary turntable is not used, said forming units being disposed in line.

Moreover according to the invention, each of said forming units can comprise a plurality of punches and a single die, means being provided to move each punch in succession in front of said die.

Further technical characteristics of the invention are defined in the claims.

The operational and constructional merits and characteristics of the invention will be more apparent from the ensuing detailed description thereof given with reference to the figures of the accompanying drawings which illustrate some possible preferred non-limiting embodiments thereof.

FIG. 1 is a schematic plan view of the plant according to the invention.

FIGS. from 2 to 17 show the product and the operative stages for its formation by the method of the invention.

FIGS. from 18 to 26 show a different product and the operative stages for its formation in accordance with the invention.

FIGS. from 27 to 33 show a further product and the operative stages for its formation in accordance with the invention.

Figure 1:
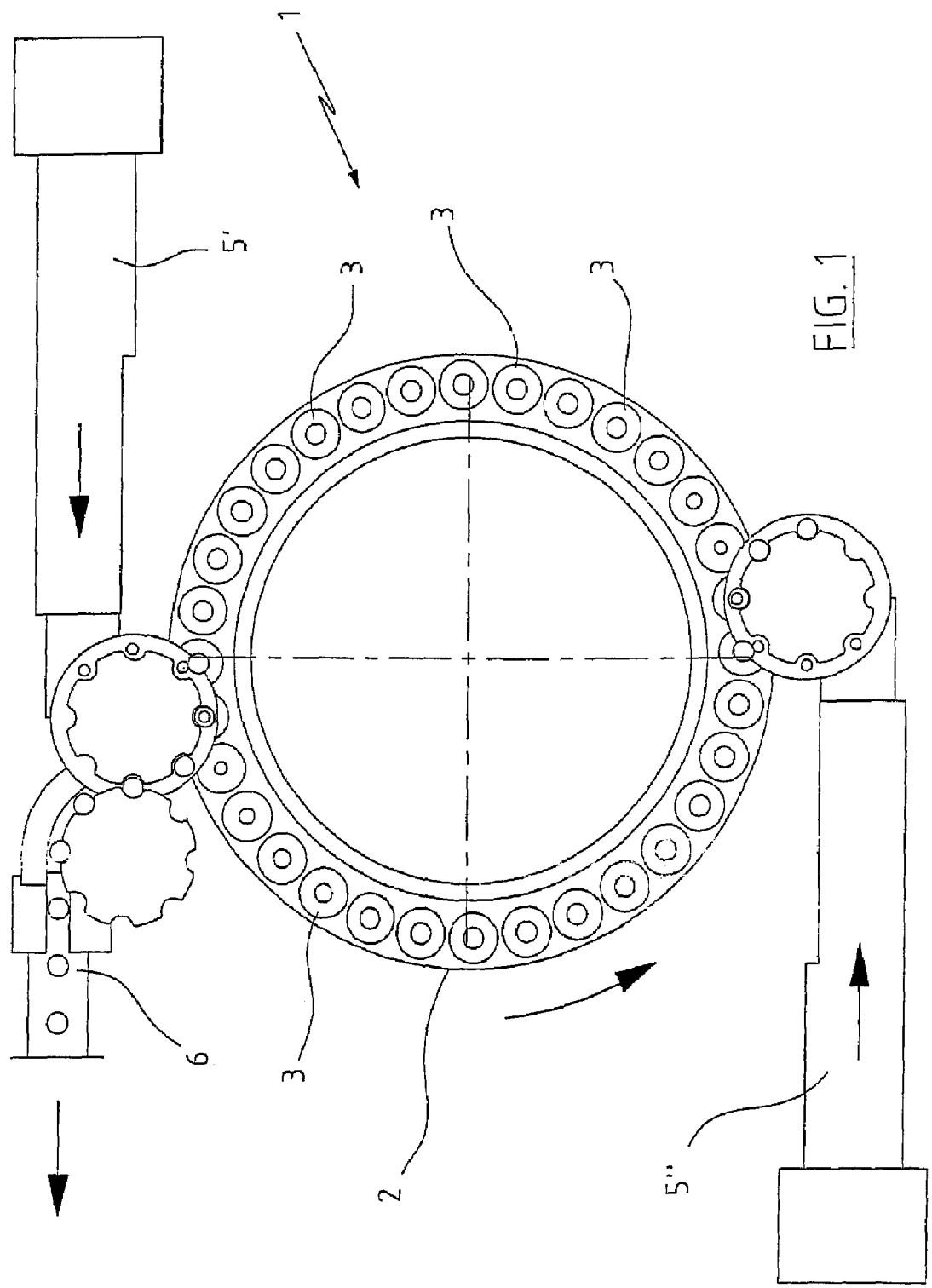

FIG. 1 shows the compression moulding plant 1 comprising a turntable is 2, which can be rotated by known means, and supports a plurality of identical forming units 3 disposed equidistant along a circumference at the edge of said turntable 2.

The pellet or measured quantity 100 (FIG. 4) is fed to each forming unit 3 by two known extruders 5' and 5" positioned tangentially to the turntable 2 in correspondence with said forming units 3.

In the illustrated embodiment a known device 6 for removing the formed article is present at the extruder 5'.

Figure 2:
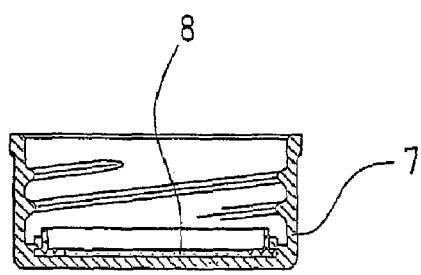

FIGS. from 3 to 17 show a first embodiment of the individual forming units 3 installed on the turntable 2. Said units 3 are arranged to form by compression moulding a cap 7 provided internally with a disc 8 or liner shown in FIG. 2.

Figure 4:
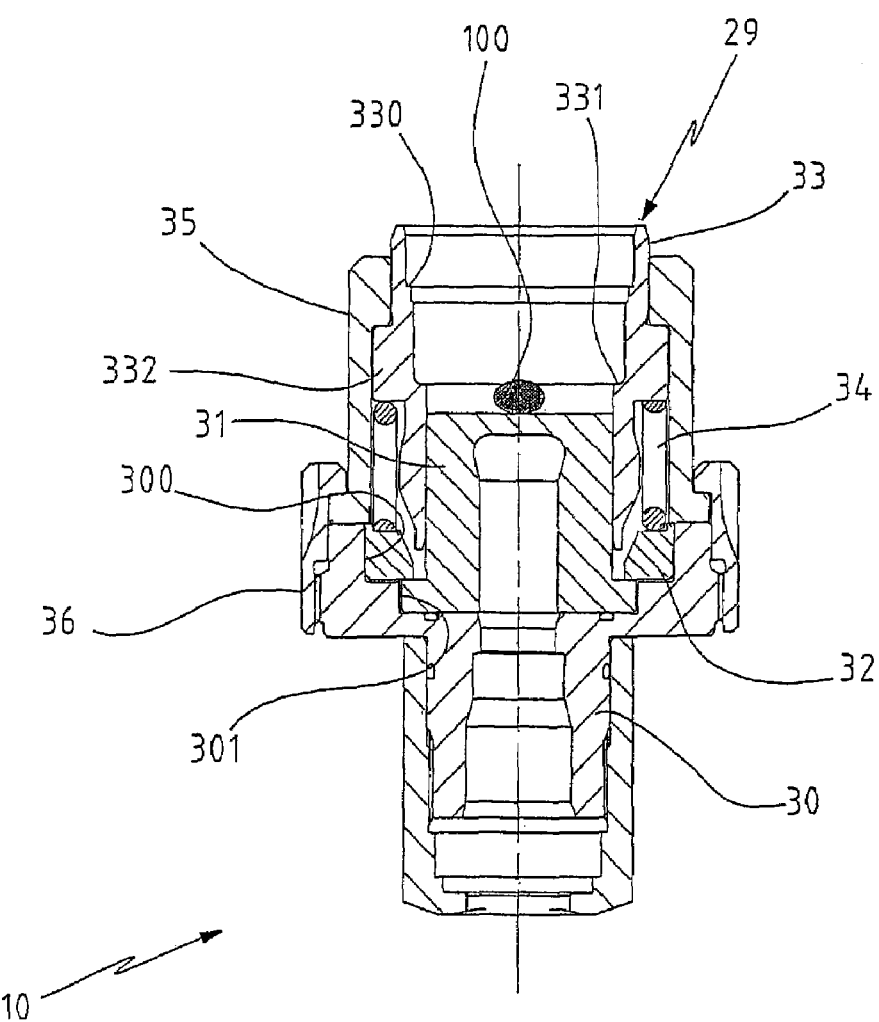
Figure 3:
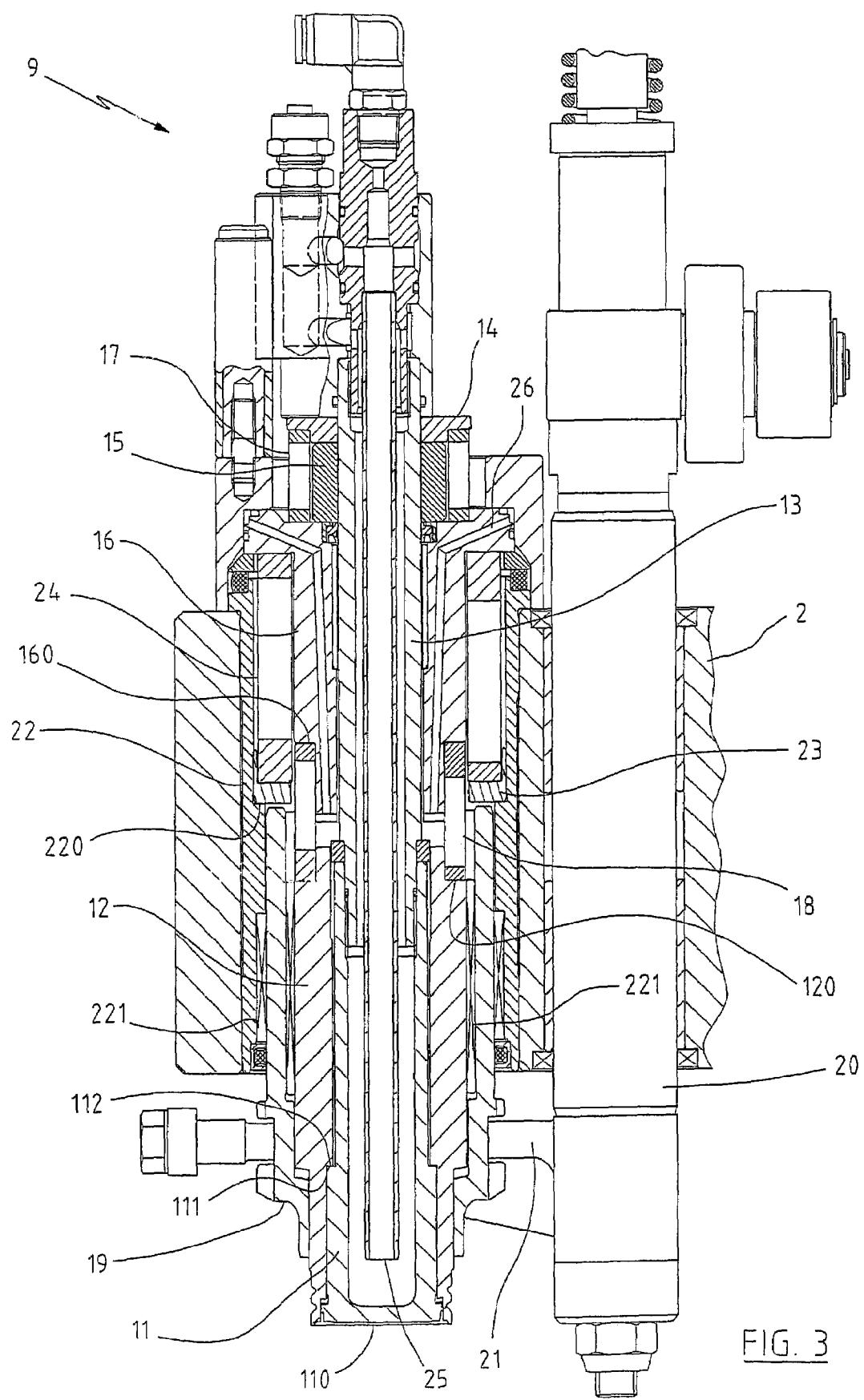

Each of said units 3 comprises an upper male half-mould 9, shown in FIG. 3, and a lower female half-mould 10, shown in FIG. 4. From FIG. 3 it can be seen that the upper male half-mould 9 comprises an internally hollow socket shaped body 11, the base 110 of which constitutes a portion of the upper pressing punch.

On the outer surface of the socket-shaped body 11 there is an annular shoulder 111 on which there rests a corresponding annular shoulder 112 present on the inner surface of a tube 12 mounted on the socket-shaped body 11. The lower outer surface of the tube, together with the base 110 of the socket-shaped body 11, forms the base of the upper pressing punch.

The socket-shaped body 11 is screwed at its top onto a tubular stem 13, which in proximity to its upper end is associated with an outer ring 14 resting on the upper end of a spacer 15, which rests on a bush 16 mounted on the outside of the stem 13, and rigid with the turntable 2. On the outside of the spacer 15 a first compression spring 17 is positioned between the ring 14 and the bush 16.

The bush 16 lowerly presents an annular shoulder 160 on which there rests the end of a second compression spring 18, the other end of which rests on an annular shoulder 120 of the tube 12.

A centering and extraction ring 19 is mounted on the tube 12 and can translate vertically, being driven by a linear actuator 20 which is connected to said centering ring 19 by a fork member 21. The linear actuator is operated by a cam rigid with the turntable 2, but not shown.

The centering and extraction ring 19 is partially received in the interior of a collar 22 by way of interposed usual sealing slide means 221 positioned both between the centering ring 19 and the collar 22, and between the centering ring 19 and the tube 12.

The collar 22 is locked in a hole in the turntable 2, and presents internally a shoulder 220 on which a cup shaped element 23 rests to receive the lower end of a third spring 24, the upper end of which rests against the lower surface of the bush 16.

The upper half-mould is also provided with a usual cooling system comprising a cooling fluid circulation conduit 25 which passes though the tubular stem 13 and opens into the socket-shaped body 11, it being connected to usual means, not shown, for feeding the cooling fluid. The bush 16 also presents a plurality of suction conduits 16, the mouths of which open in proximity to its lower and upper edges, they being connected to suction means and/or delivery means for a pressurized fluid, the function of which is clarified hereinafter.

The female lower half-mould 10 comprises a die 29 consisting of a cylindrical block 31 and a tubular body 33 mounted about said block. The forming cavity is defined by the inner surface of the body 33, which presents two shoulders 330 and 331 (FIG. 4), and the upper surface of the cylindrical block 31.

The die 29 is supported by a cup 30 which can translate vertically, being associated with usual hydraulic drive means. The cup 30 is provided with two concentric annular recesses 300 and 301. The annular recess 301 receives the cylindrical block 31, the upper surface of which represents the base of the forming cavity.

The annular recess 300 receives a ring 32 having the double function of locking the cylindrical block 31 within the recess 301, and supporting said body 33 via a spring 43 positioned between said ring and an annular enlargement 332 of the body 33.

The body 33 is inserted into a sleeve 35, against the upper edge of which there rests the annular enlargement 332 of the body 33, and with the lower edge of which there is associated a ring nut 36 which rigidly fixes it to the cup 30.

A cooling device, not shown because of known type, is also associated with the lower half-mould 10.

The operation of the first embodiment of the invention is explained with the aid of FIGS. from 5 to 17 which illustrate the various operative stages thereof.

Figure 5:
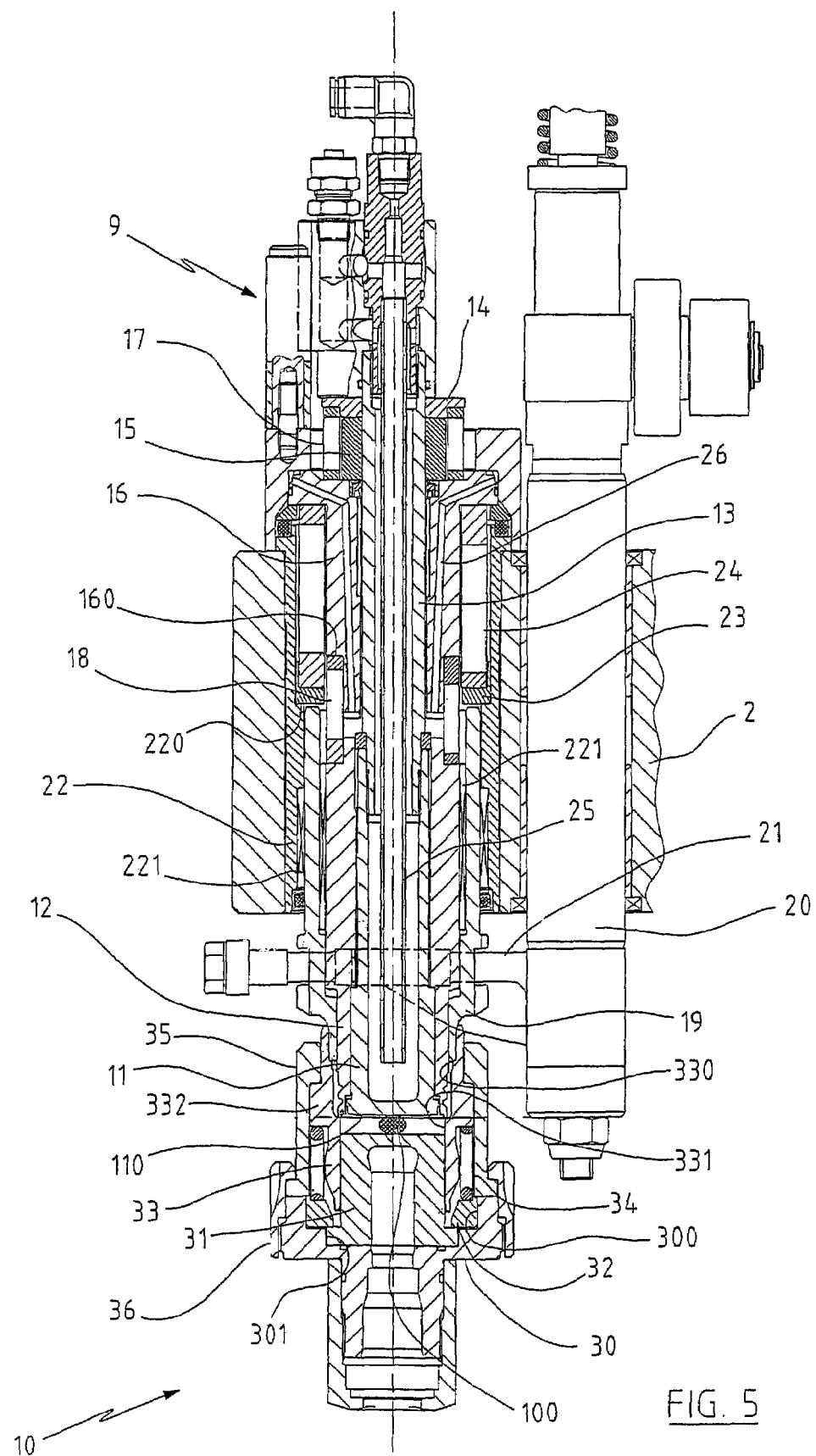
Figure 12:
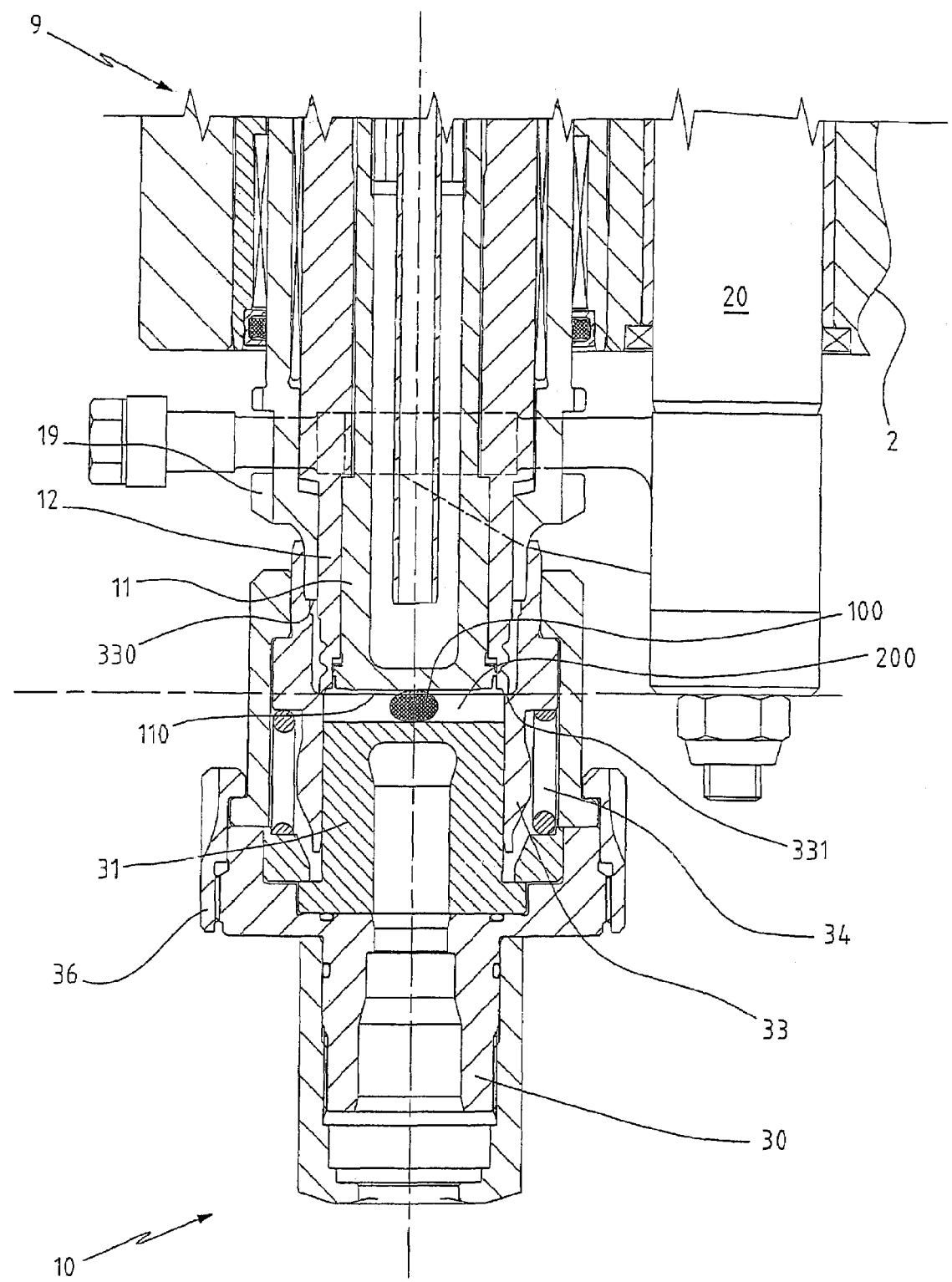

The two half-moulds 9 and 10 must firstly be withdrawn from each other to insert a measured quantity 100 of synthetic material into the cavity of the die 29. The lower half-mould is then made to rise into the position shown in FIGS. 5 and 12, where it can be seen that the lower edge of the tube 12 rests against the annular shoulder 331 of the body 33 to define, together with the base 110 of the socket-shaped body 11 and the upper surface of the block 31, the first forming chamber 200.

At the same time the lower edge of the centering and extraction ring 19 is partly inserted into the body 33 and rests against the annular shoulder 330.

Figure 6:
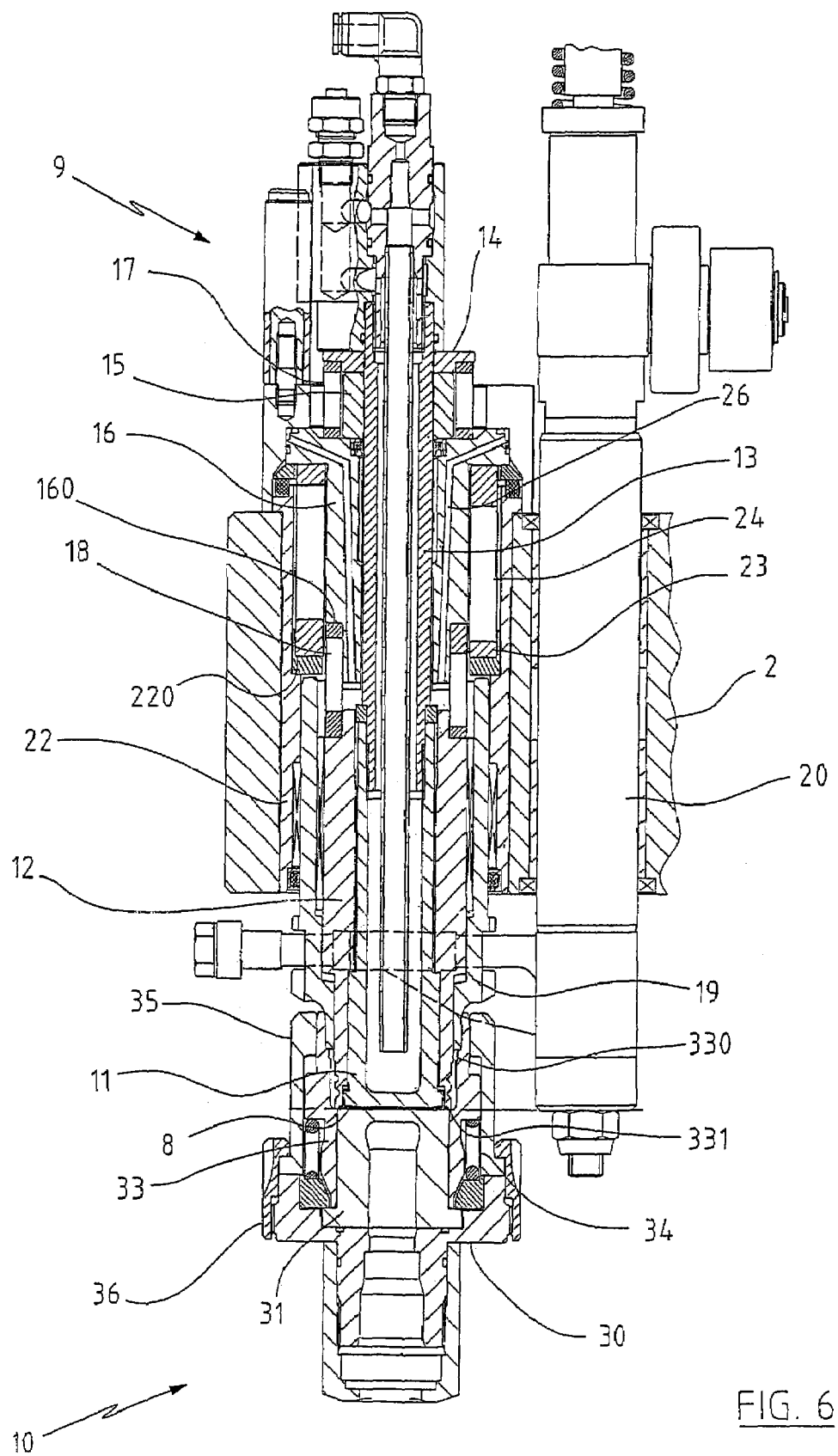
Figure 13:
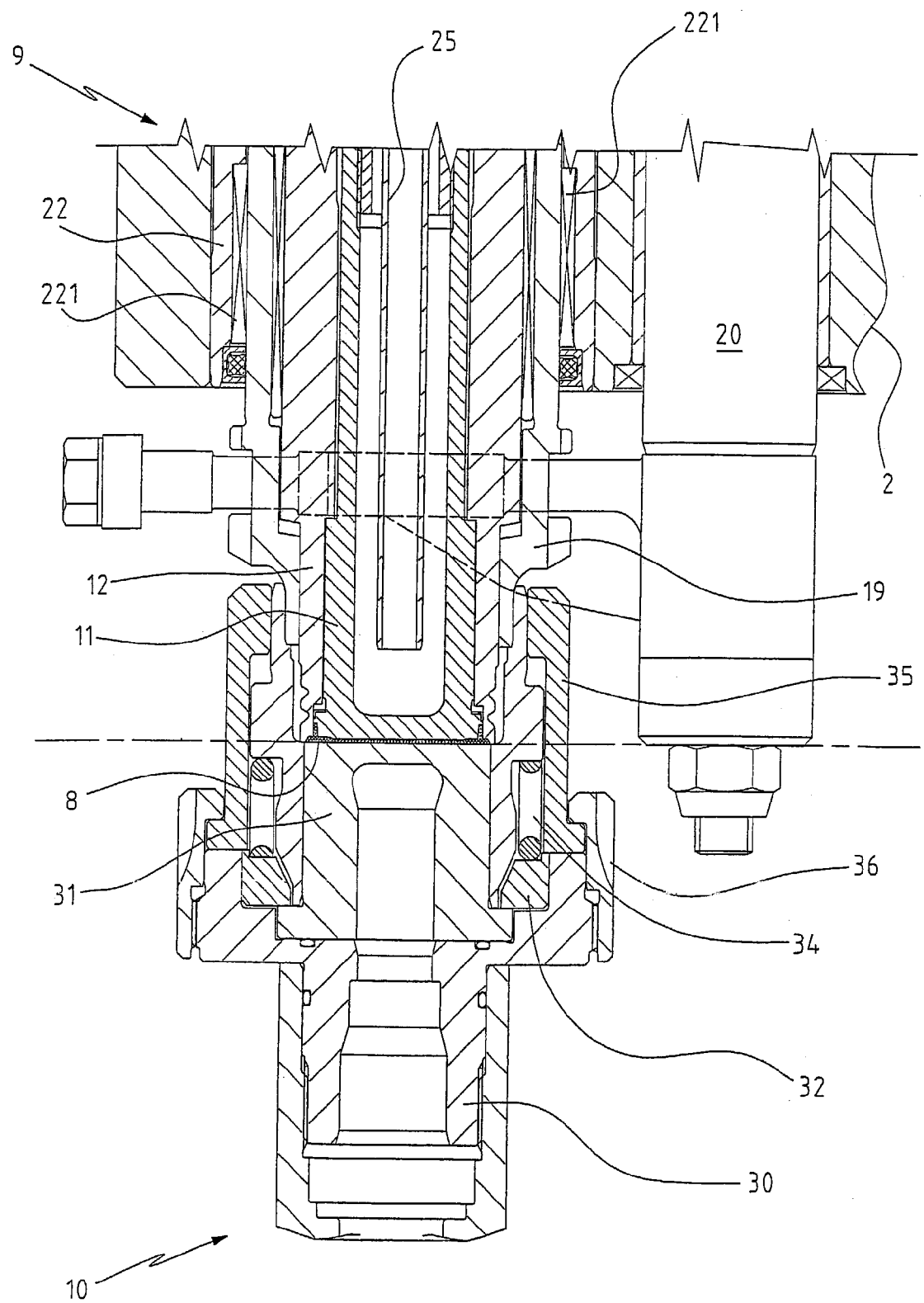

At this point using drive means, not shown, the cup 30 and hence the cylindrical block 31 are translated vertically against the action of the springs 18 and 34, as shown in FIGS. 6 and 13. The translating cup compresses the measured quantity which becomes distributed within the forming chamber to create the disc 8. The incompressibility of the plastic material causes the cup to halt in the final first pressing position shown in FIG. 6.

When the plastic material, i.e. a thermoplastic, has attained a suitable solidification point by virtue of the cooling induced by the cooling with which the mould is provided, the mould is opened to insert a second measured quantity of plastic material into the cavity of the die 29.

It should be noted that before opening the mould to insert the second measured quantity 201, the means 26 are activated to create a vacuum in the interior of the upper half-mould 9. These means create a vacuum which acts on the liner 8 to retain it against the base 10 of the socket-shaped body 11, to prevent the liner separating from the base 110 during the mould opening.

Figure 7:
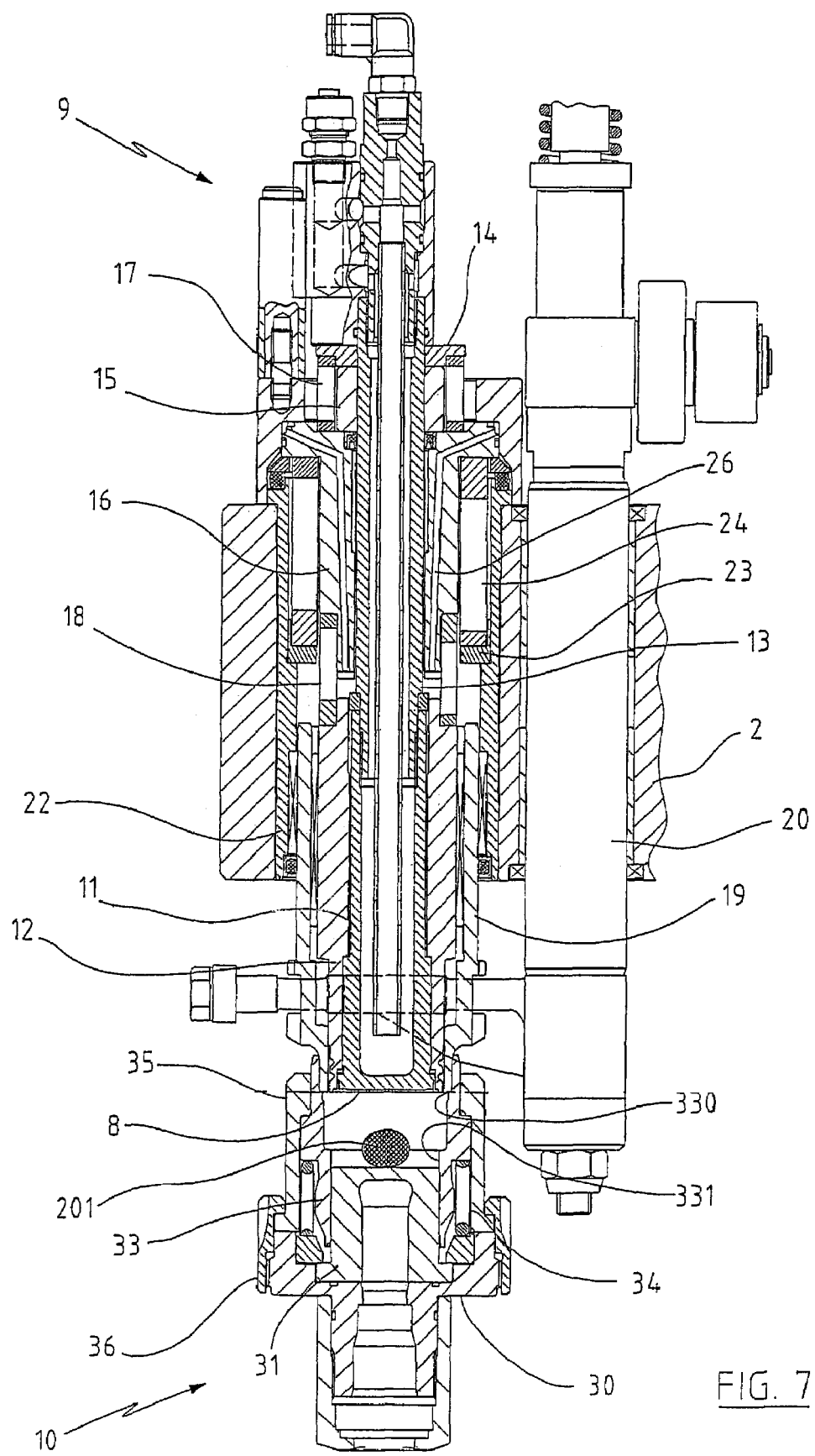
Figure 8:
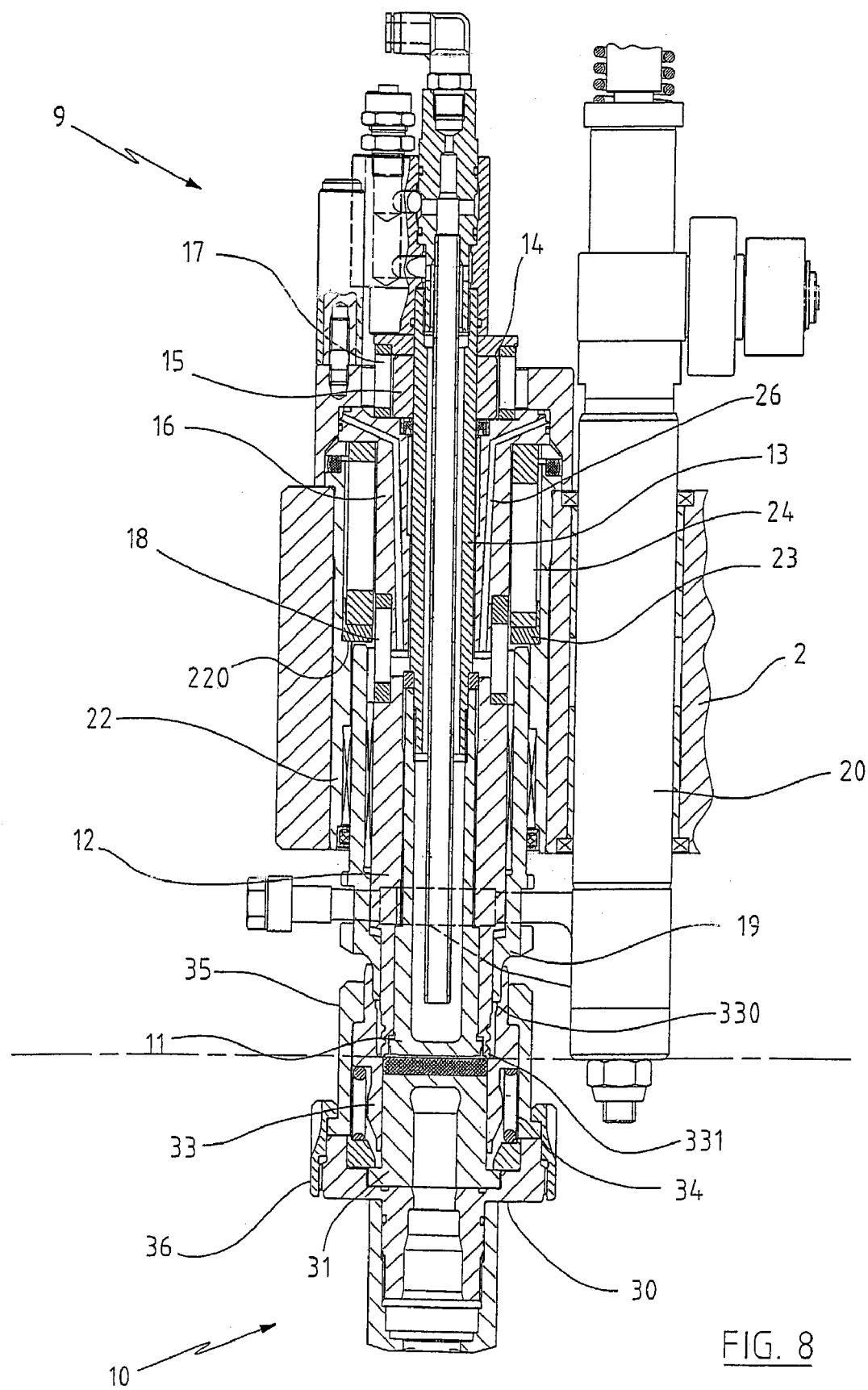
Figure 14:
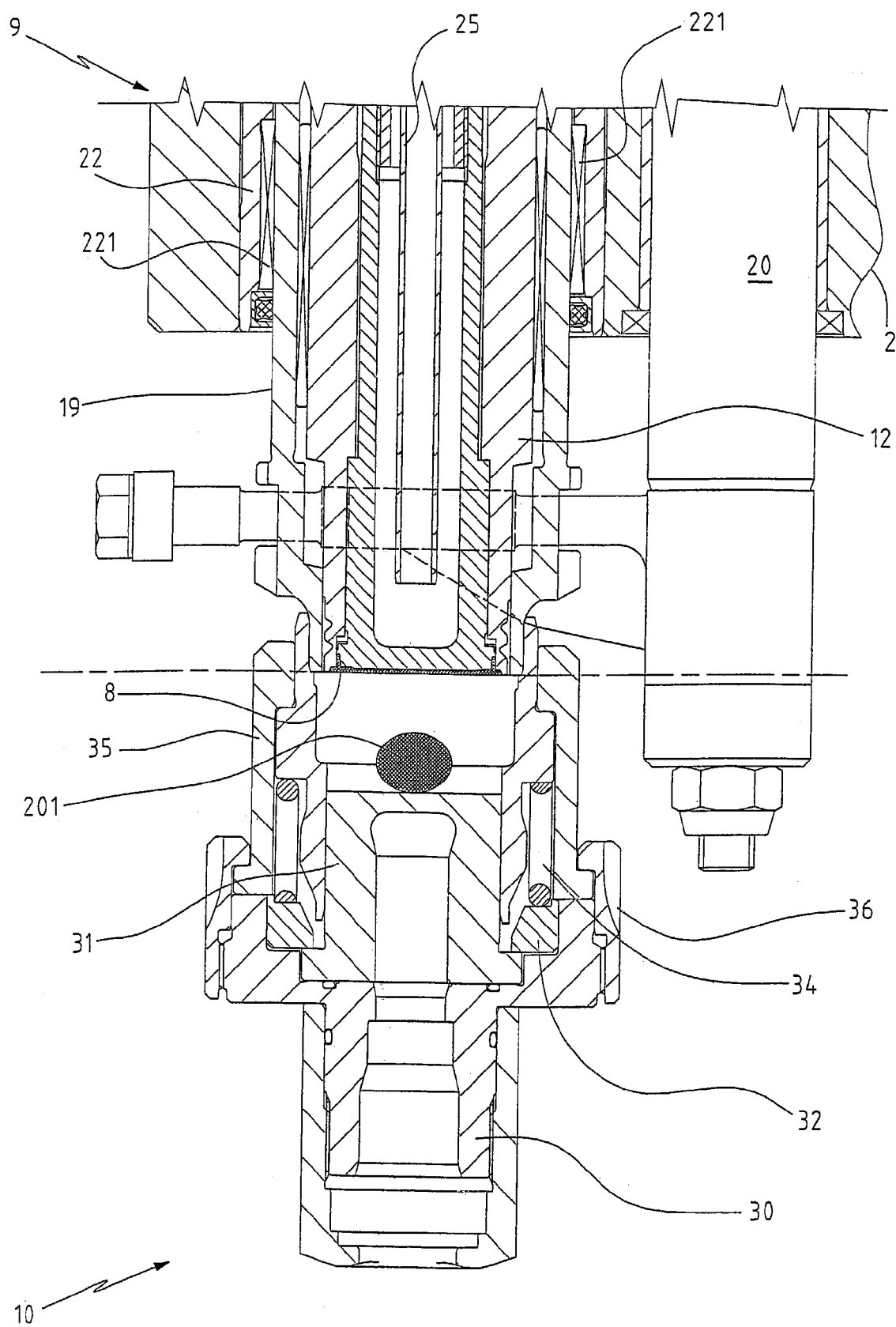

When the second measured quantity 201 has been inserted the mould is closed as shown in FIGS. 7 and 14. From FIG. 14 it can be seen that the linear actuator 20 lowers the centering and extraction ring 19, to bring its lower edge to the same level as the lower edge of the tube 12, hence defining a second forming chamber.

Figure 9:
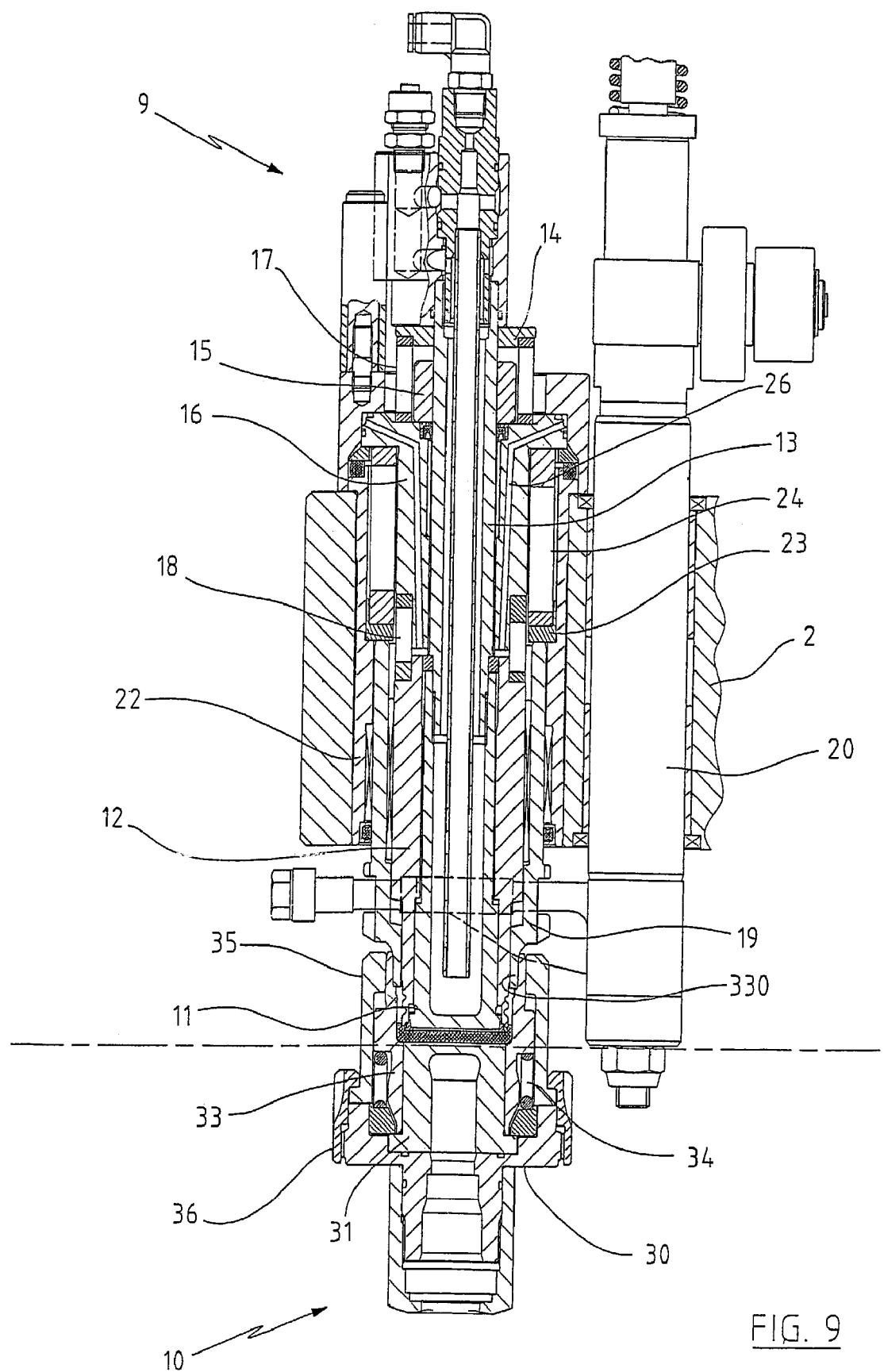
Figure 15:
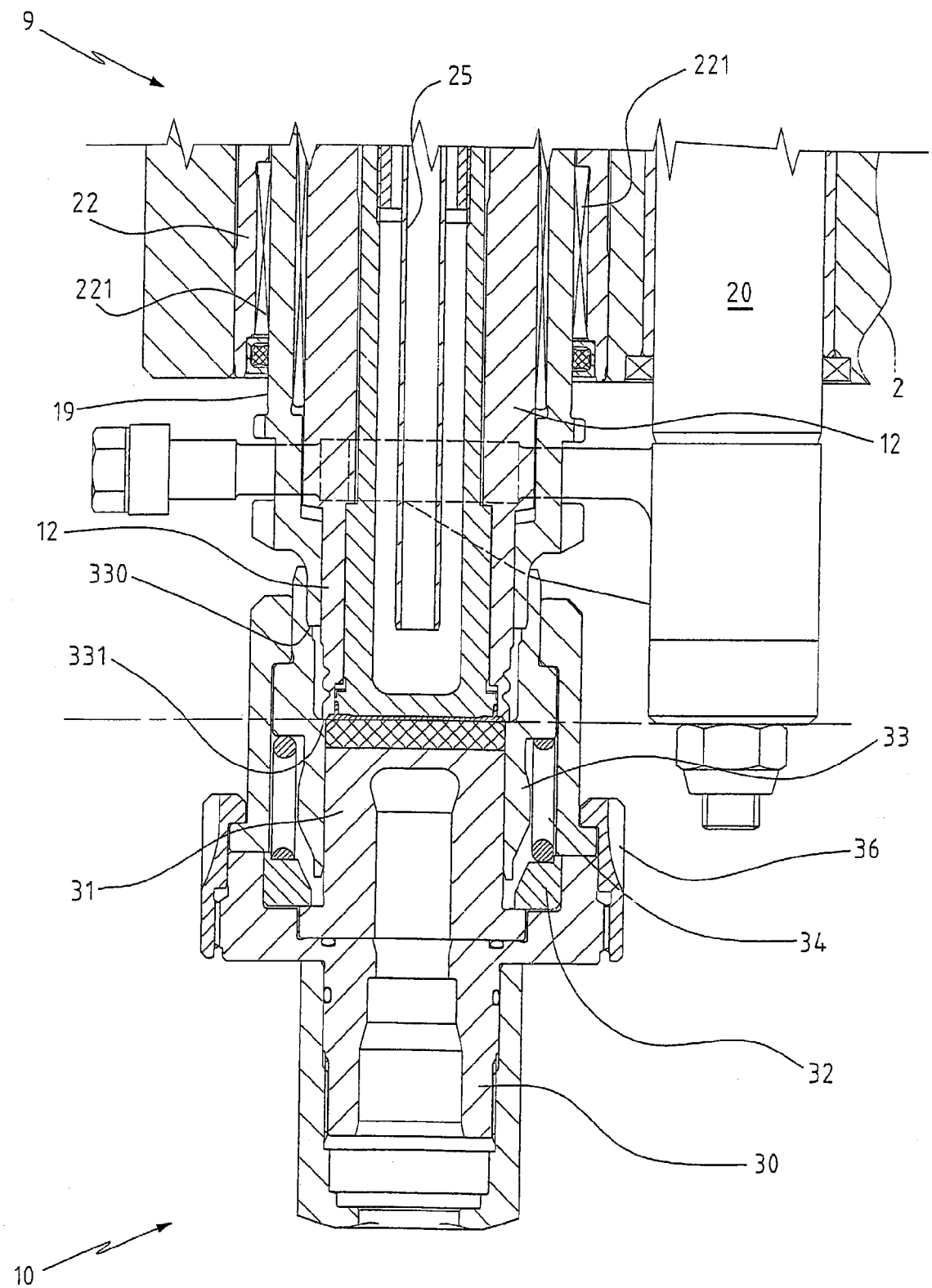
Figure 16:
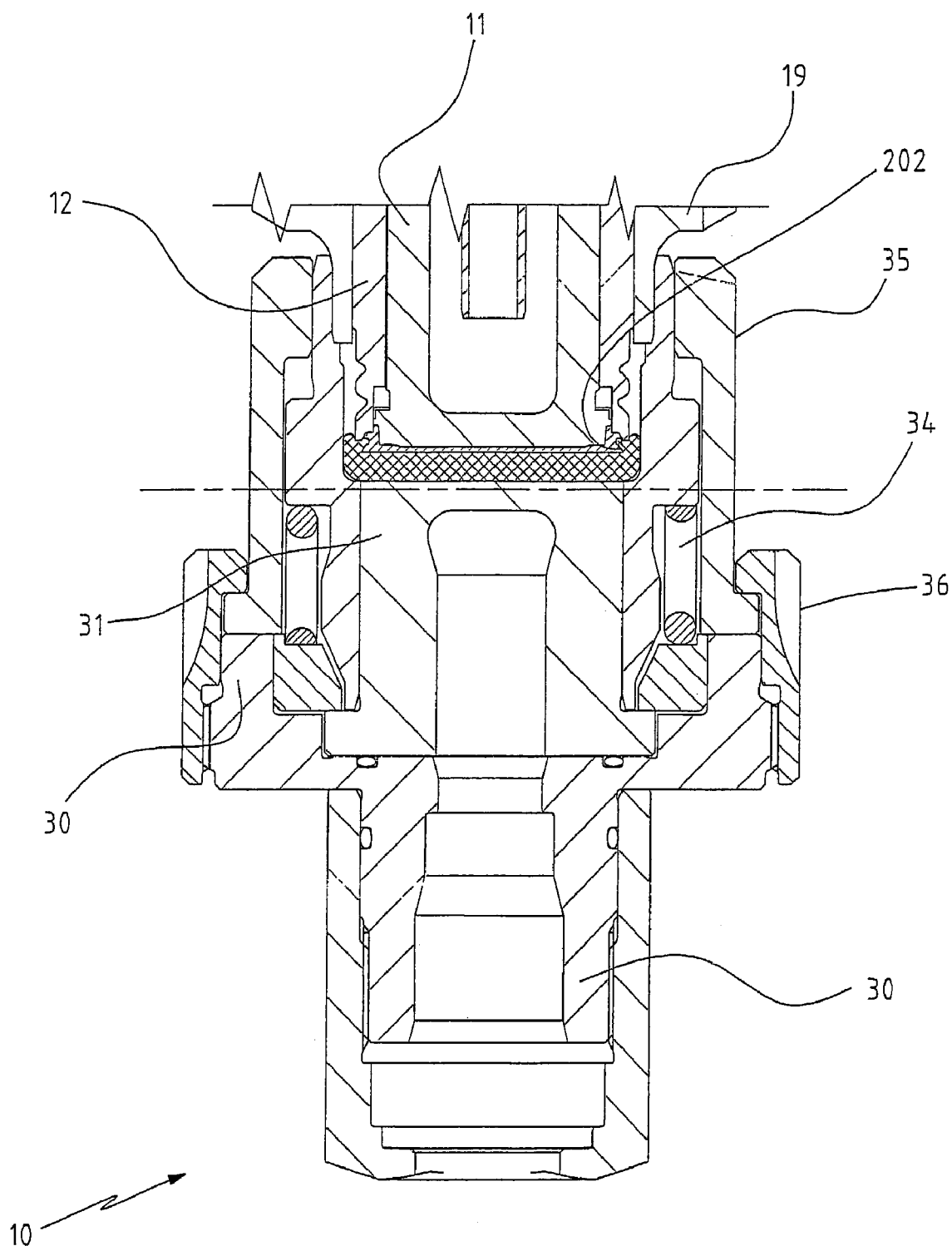
Figure 17:
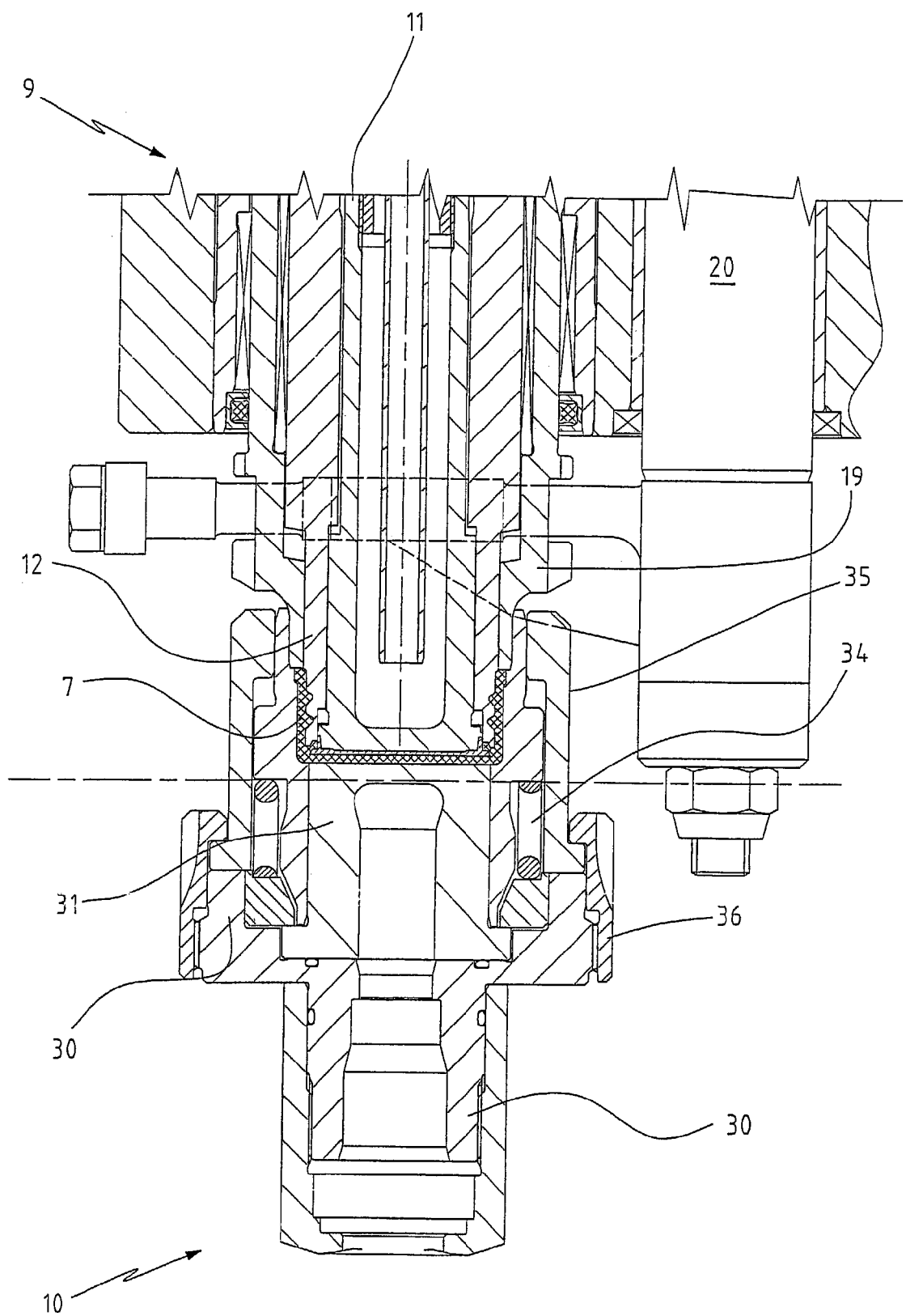

At this point the cup 30 is made to rise vertically, to move the centering and extraction ring 19 upwards until the lower edge of the tube 12 rests against the shoulder 331 of the body 33, as shown in detail in FIG. 15. As shown in FIGS. 9 and 16, the movement of the cup 30 then causes lowering of the socket-shaped body 11 and of the tube 12 against the action of the spring 18. During this stage the material becomes distributed within the undercut which forms between the lower edge of the liner 8 and the lower edge of the tube 12, to form a retention ring 202 for the liner. In this position the centering ring 19 rests against the cup element 23 (FIG. 9) and tends to raise it against the action of the spring 24.

Figure 10:
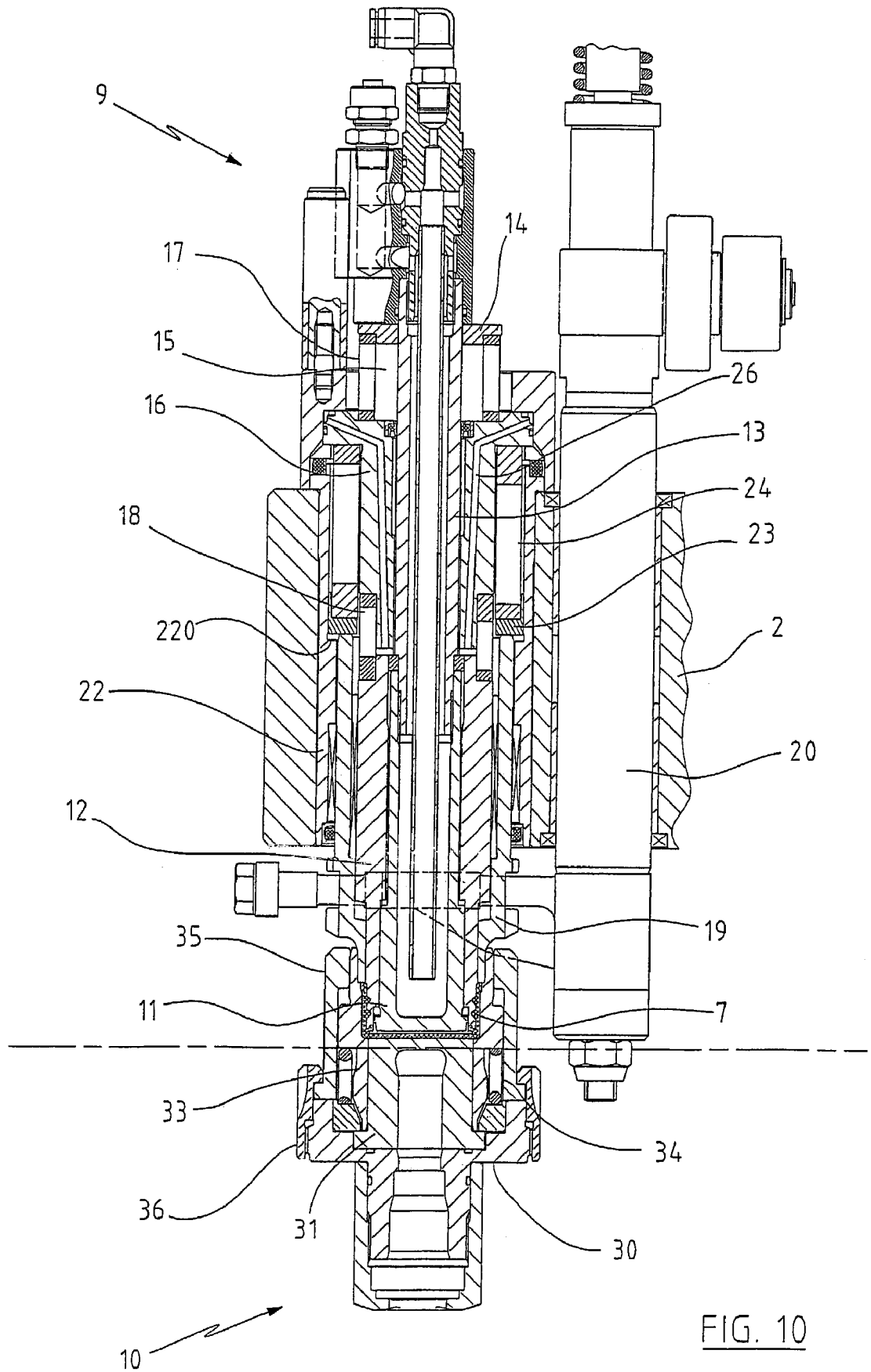

The upward thrust of the cup 30 then causes the centering ring 19 to further rise against the force exerted by the spring 24, as shown in FIG. 10, and at the same time the material becomes all distributed within the forming chamber to create the cap 7.

Figure 11:
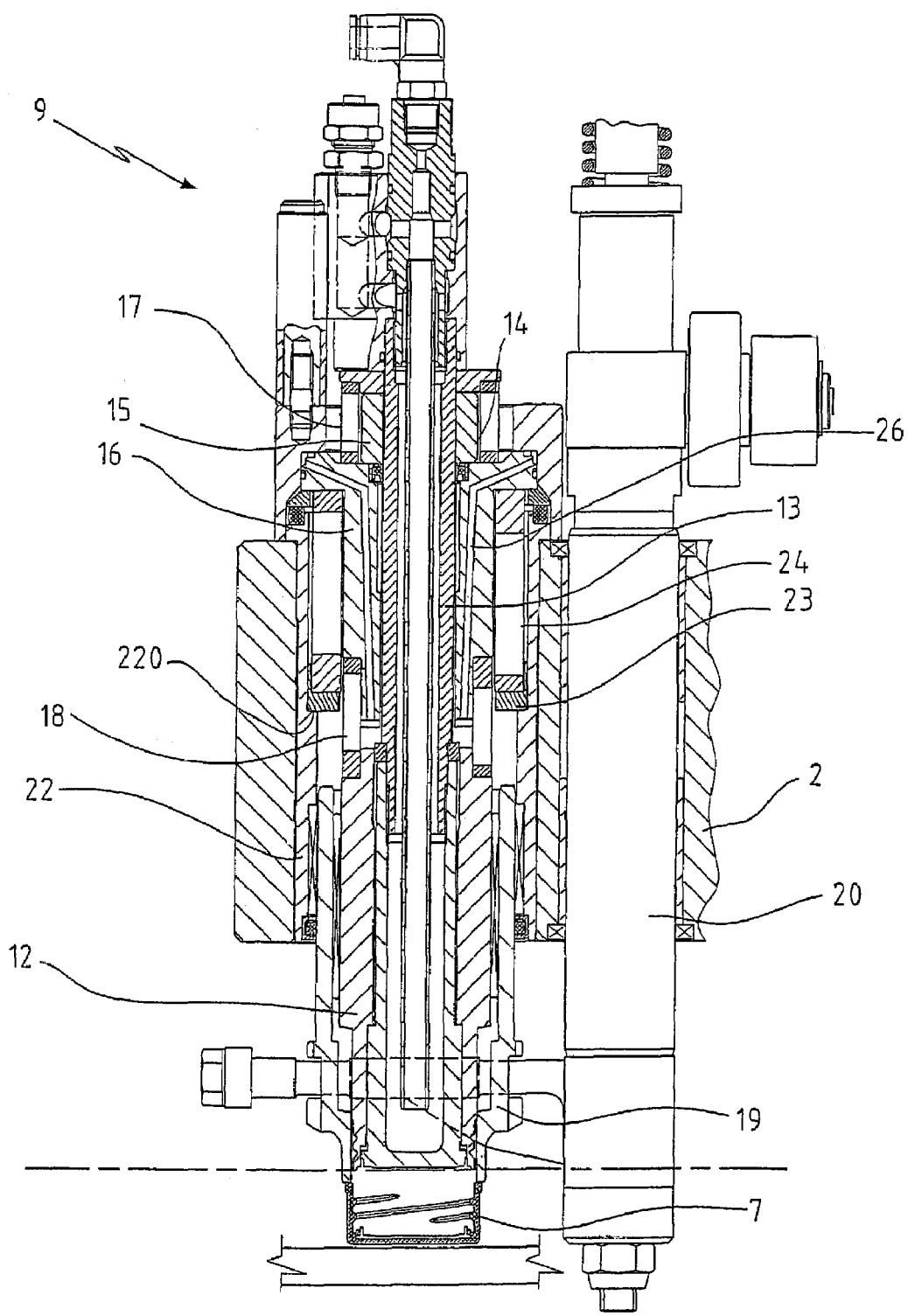

When the cap 7 has been formed, the mould is opened and the linear actuator lowered so that the socket-shaped ring presses against the edge of the cap 7 to extract it from the upper half-mould (FIG. 11).

Figures 18, 19:
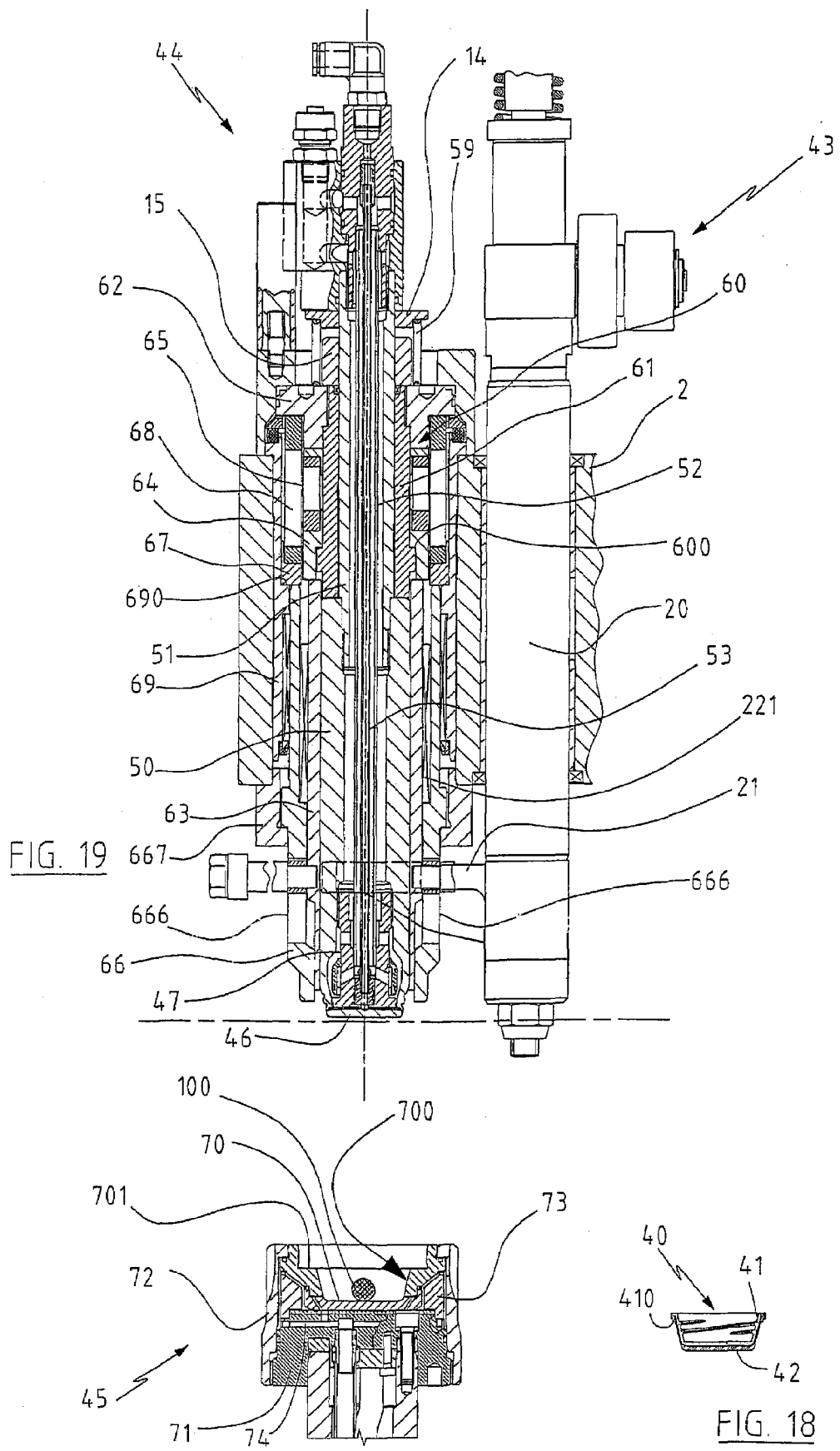

FIGS. from 18 to 26 show a second embodiment of the invention which enables a cap 40 to be formed comprising an inner portion 41 clad with an outer covering 42 (FIG. 18).

In the description of the second embodiment the same reference numerals will be used to indicate those identical components already described in the preceding embodiment of the invention.

The cap 40 is formed by forming devices 43 comprising an upper half-mould 44 and a lower half-mould 45.

Figure 20:
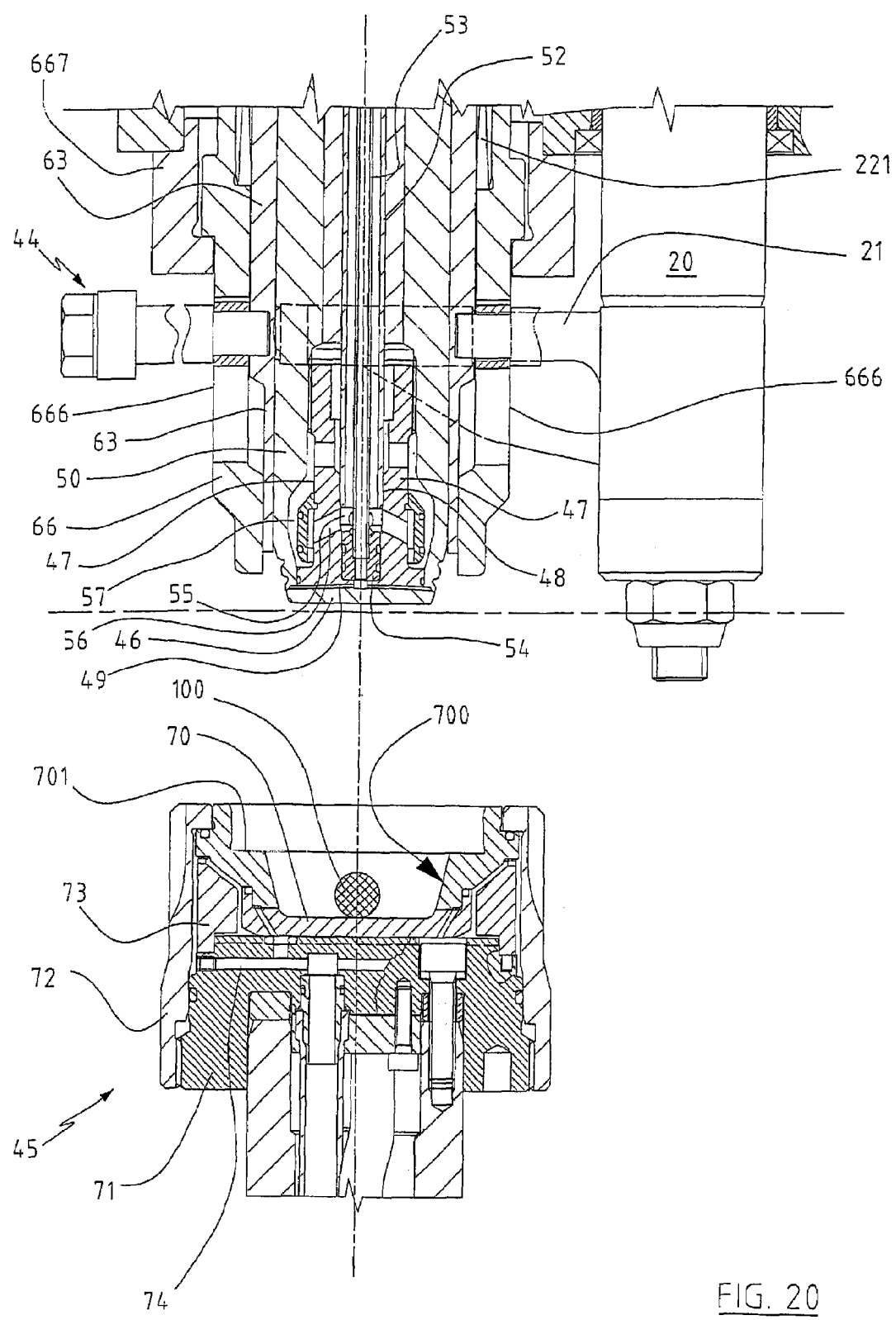
Figure 21:
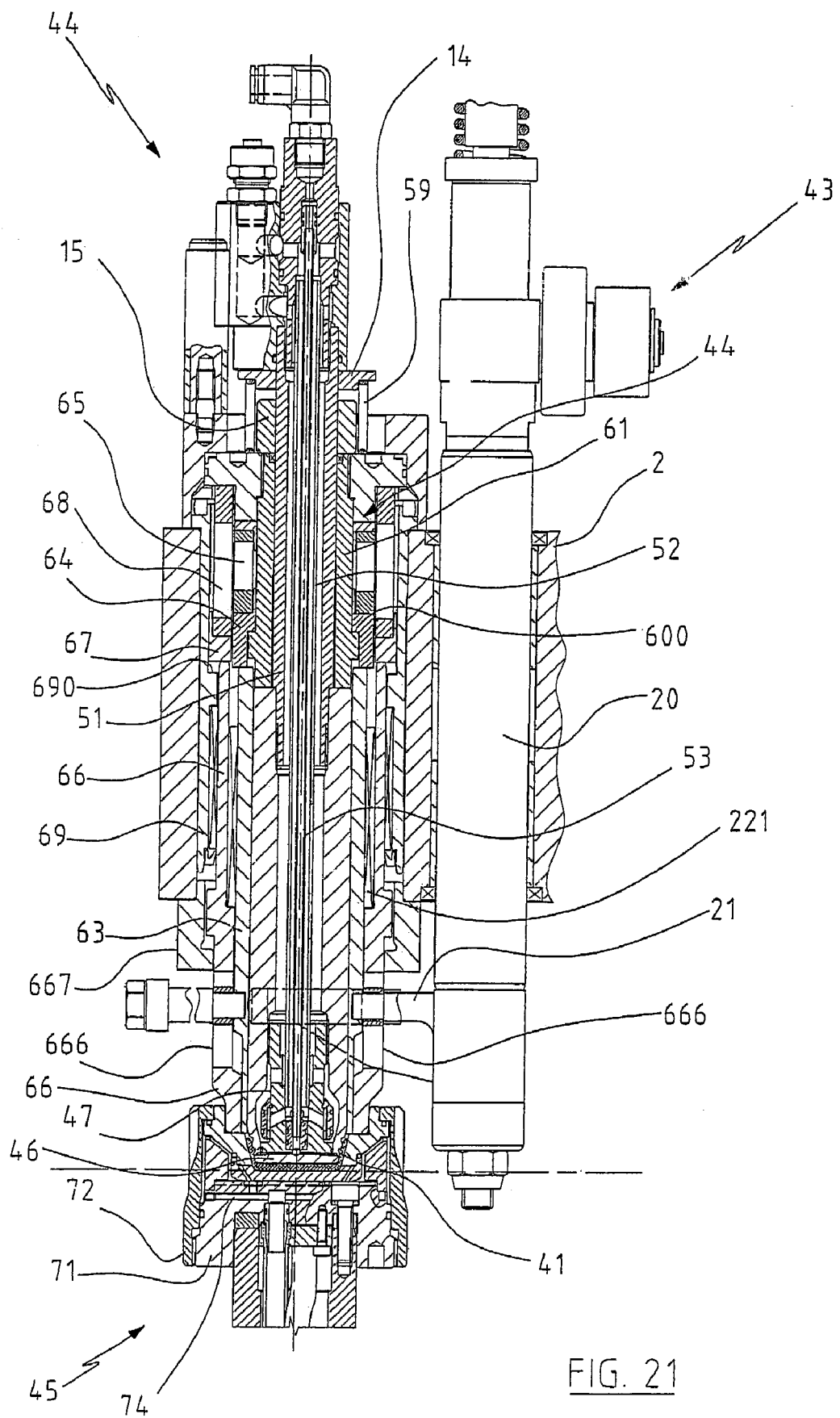

With particular reference to FIGS. 19 and 20 it can be seen that the upper half-mould 44 comprises a disc-shaped punch 46 upperly provided with a shank 47 provided with a central cavity 48, the bottom of which communicates with a plurality of conduits 49 which open into the lateral surface of the punch 46.

The shank 47 (FIG. 19) is screwed onto a sleeve 50 which is screwed onto a tubular stem 51. In the interior of the tubular stem 51, of the sleeve 50 and of the cavity 48 of the shank 47 there are inserted two tubes, one inside the other, indicated by the numerals 52 and 53, and connected respectively to a cooling system and to a pressurized air blowing system. In detail, the tube 53 (FIG. 20) is sealedly mounted on a centrally bored cylinder 54 received on the base of the cavity 48, and communicates with the conduits 49 via the hole of the cylinder 54. The other end of the 53 is connected to said pressurized air delivery system, not shown being of usual type.

The tube 52 (FIG. 20) rests on an annular shoulder of the cavity 48 and opens into a chamber 55 from which a plurality of radial conduits 56 branch to open on the outside of the shank 47. Said radial conduits specifically open into an annular interspace 57 present between the inner surface of the sleeve 50 and the shank 47.

The upper end of the tube 52 is connected to a cooling system, not shown being of usual type.

With reference to FIG. 19, with the tubular stem 51 there is associated an outer ring 14 which rests, via the spring 59, on an annular member 60, into which the tubular stem, rigid with the turntable 2, is inserted. On the tubular stem 51 there is also mounted a spacer 15 resting on the member 60 and positioned concentric to the spring 59.

The member 60 is composed of a tubular element 61 into which a ring 62 is screwed.

As can be seen from FIG. 19, the spring 59 maintains the sleeve 50, screwed onto the tubular stem 51, resting against the lower surface of the member 60. On the sleeve 50 there is mounted an extraction ring 63 connected to a linear actuator 20 by a fork member 21.

When the mould is open (FIG. 19) the upper edge of the extraction ring 63 rests on the edge of a. cup 64 mounted on the outside of the member 60, and on which there rests a spring 65, the other end of which rests on an annular shoulder of the member 60. Said cup is normally maintained against an annular shoulder 600 of the member 60, as shown in FIG. 19. On the outside of the extraction ring there is provided a closure ring 66 having two slots through which the fork 21 connecting the extraction ring 63 to the linear actuator 20 passes. As can be seen from FIG. 19, the closure ring 66 rests against an annular bracket element 667 rigid with a hole in the turntable which supports the forming unit.

The closure ring is inserted in an annular collar inserted into said hole in the turntable 2 which supports the forming unit. Sealing slide means 221 are present between the closure ring and the extraction ring, and between the closure ring and said collar.

The collar 60 presents an inner annular shoulder 690 on which there rests a socket 67 acting as a lower end guide for a spring 68, the other end of which rests against an annular shoulder of the member 60. The lower half-mould comprises a die 70, internally defining the forming cavity 700, which is fixed to an overlying support member 71 by an external ring nut 72, a ring 73 being interposed between said die 70 and said support member.

The support member 71 can translate vertically, being associated with suitable hydraulic operating means, not shown being of known type. Inside the member 71 there are provided a plurality of channels 74 connected to a usual cooling system.

The forming cavity 700 receives the feed quantities to be pressed to form the product, and comprises an annular shoulder 701 on which both the edge of the closure ring and the edge of the extraction ring rest when the mould is closed.

Figure 22:
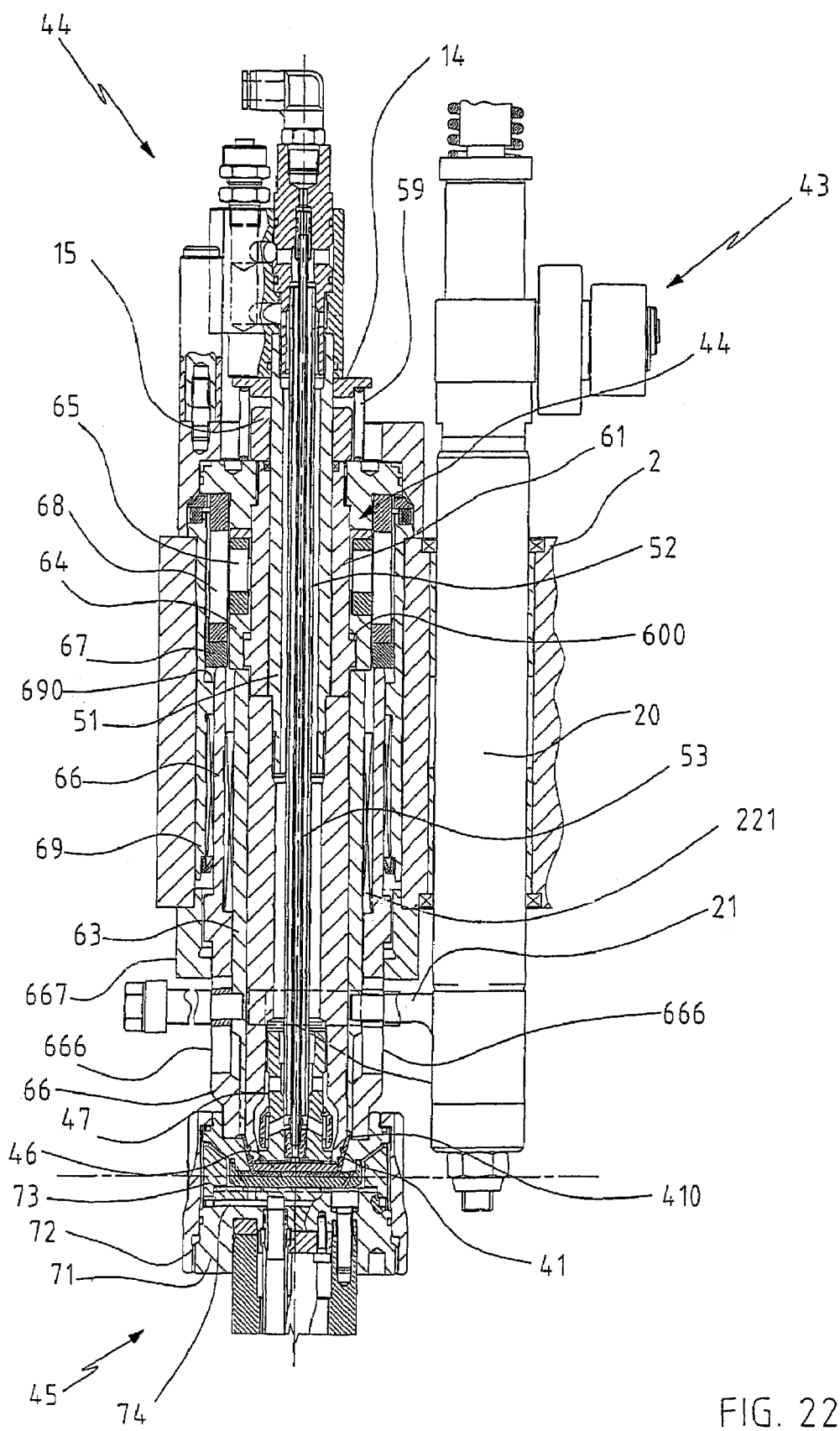
Figure 23:
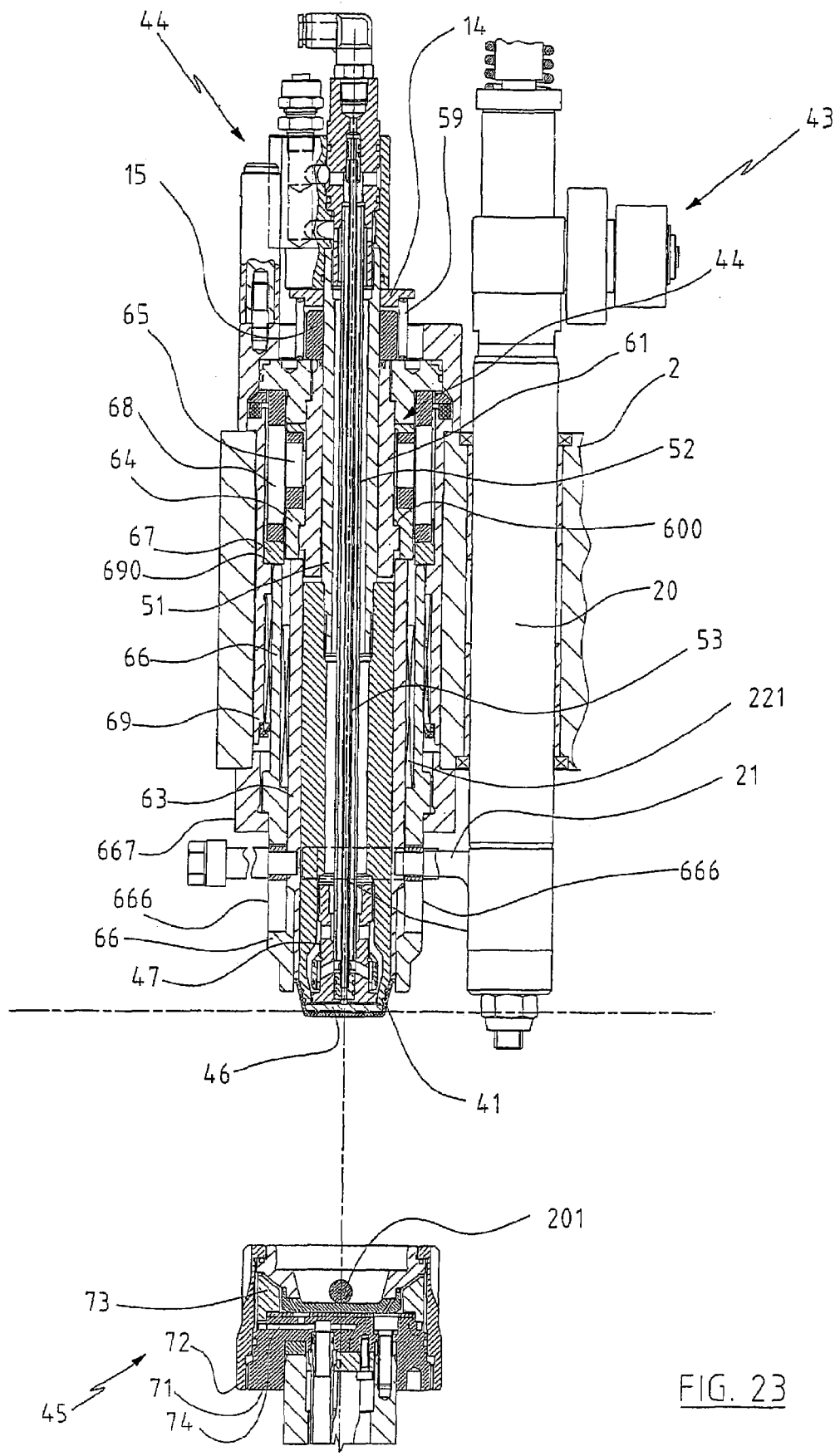
Figure 24:
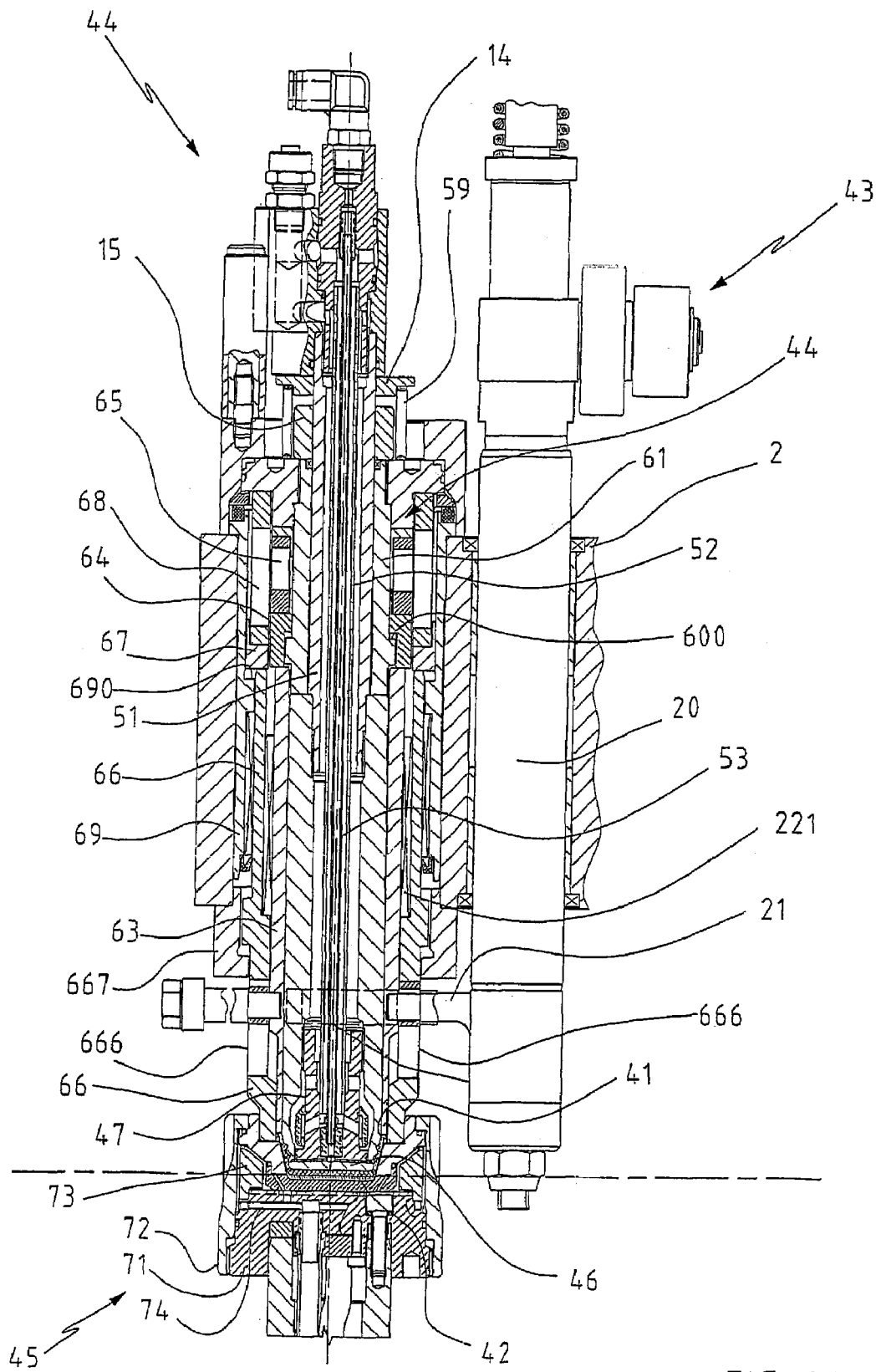
Figure 25:
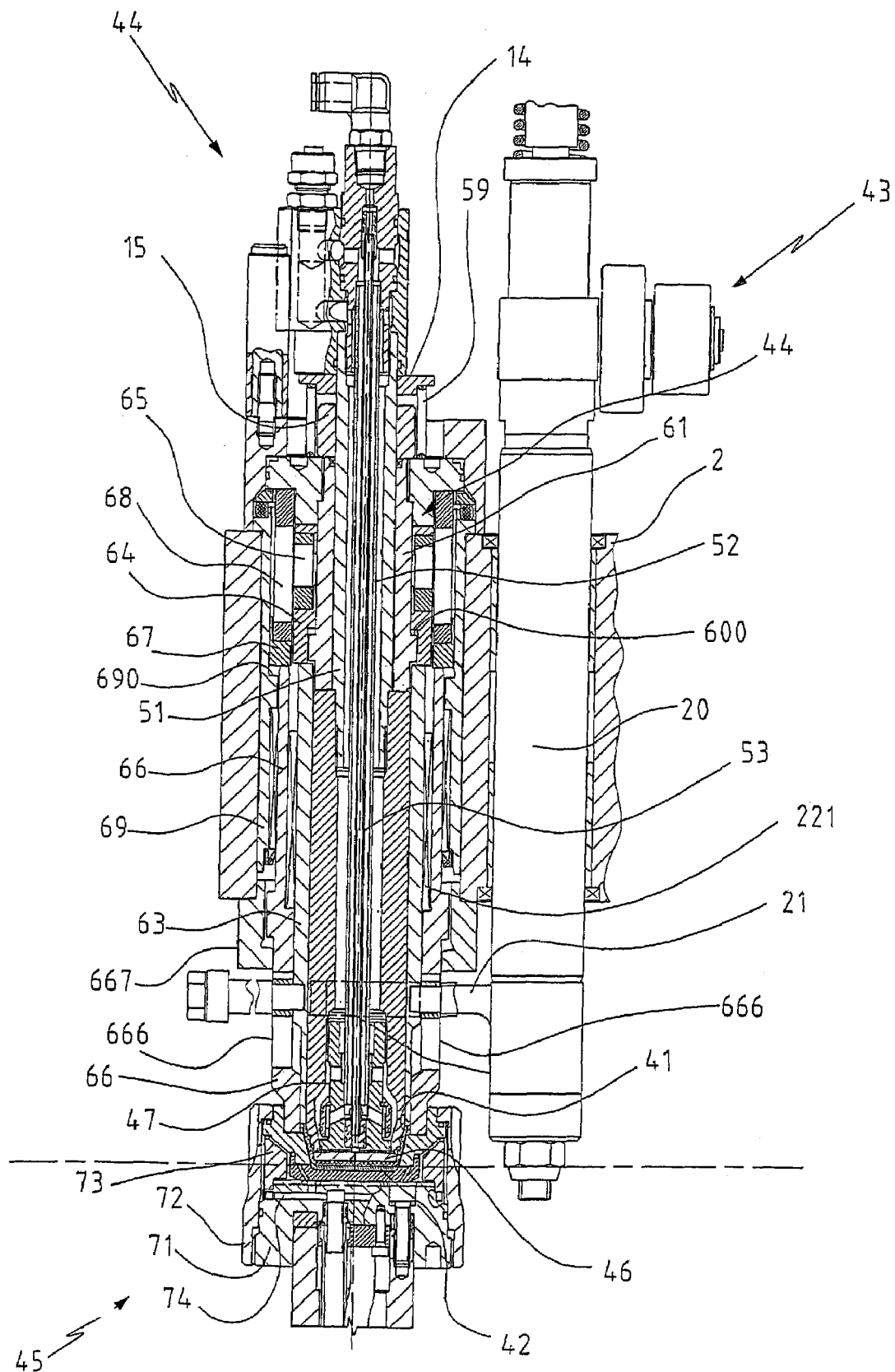
Figure 26:
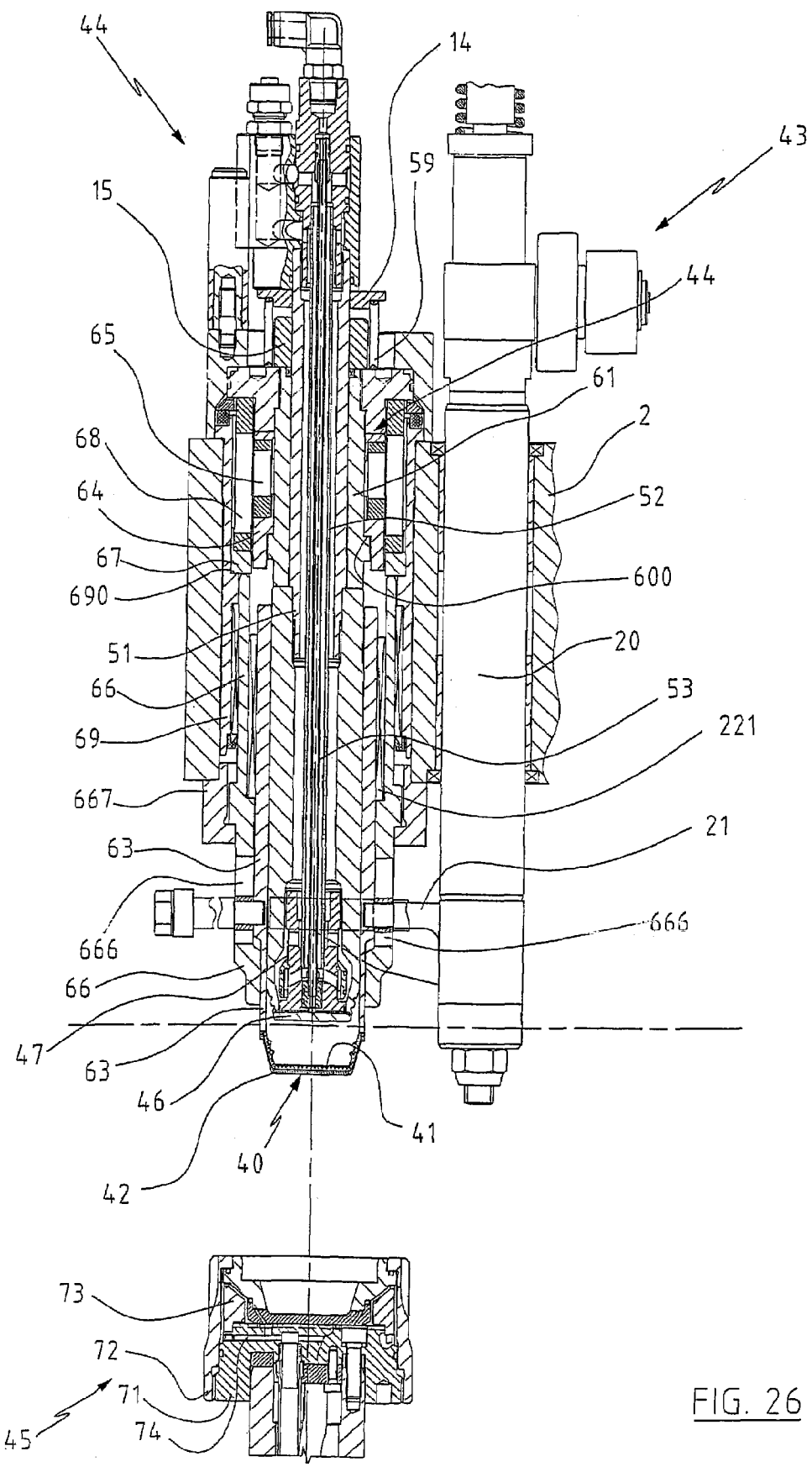

The product is formed by inserting the first annular measured quantity 100 into the forming cavity with the mould open (FIG. 19) then closing the mould to define a first forming chamber. When the mould is closed, the pressing of the measured quantity 100 commences by raising the lower half-mould. The upward movement of the lower half-mould causes both the extraction ring 63 and the closure ring 66 to rise against the action of the respective springs 65 and 68. When the material being pressed comes into contact with the lower edge of the extraction ring, this is urged further upwards. It should be noted that the extraction ring may either rest or not rest against the lower surface of the shoulder of member 60, depending on the moulding pressure. In this manner the edge 410 of the insert 41 of the cap 40 is formed, as shown in FIG. 22.

When formation of the cap insert 41 is complete, the mould is reopened, a second measured quantity 201 is inserted into the cavity and the mould is reclosed to define a second forming chamber, which comprises the outer surface of the insert 41 in addition to a portion of the cavity 700. Moulding of the second measured quantity takes place substantially in the aforedescribed manner, as will be clear from the accompanying figures. When the cap has been moulded the mould is reopened and the linear actuator 20 is lowered to cause the extraction ring to move downwards and extract the formed cap 40. It should be noted that during the extraction stage the compressed air delivery system is activated to inflate the cap in order to facilitate its detachment.

FIGS. from 27 to 37 show a third embodiment of the invention for forming a cap 80 comprising an inner portion 800 and an outer covering 801.

In the description of the third embodiment of the invention, the same reference numerals will be used to indicate those identical components already described in the preceding embodiments of the invention. The cap 80 is formed by forming devices 81 comprising an upper half-mould 82 and a lower half-mould 83.

Figure 29:
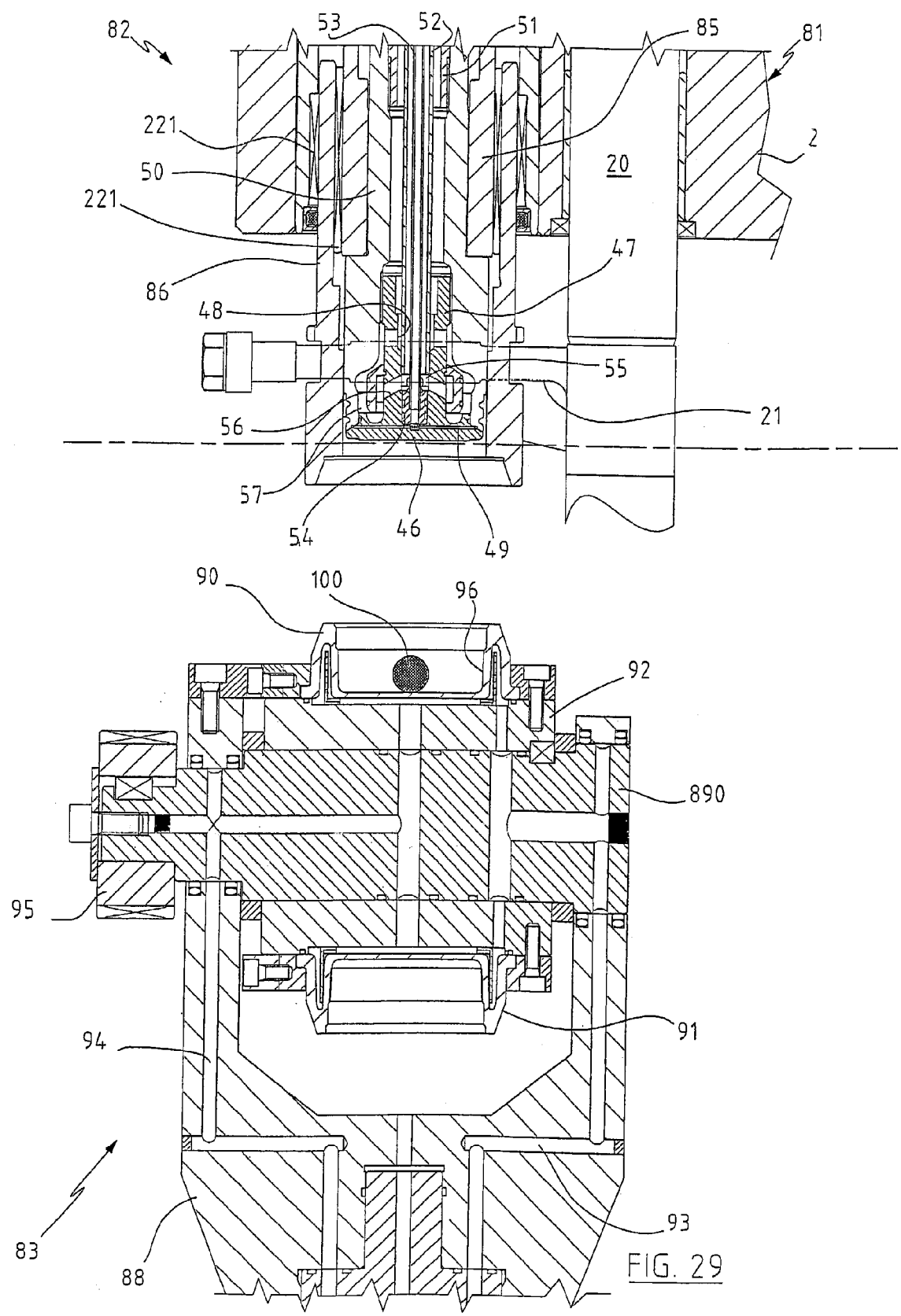

With particular reference to FIGS. 28 and 29 it can be seen that the upper half-mould 81 comprises a punch 46 upperly provided with a shank 47 provided with a central cavity 48, the bottom of which communicates with a plurality of conduits 49 which open into the lateral surface of the punch 46.

The shank is screwed onto a sleeve 50 which is screwed onto a tubular stem 51. In the interior of the tubular stem 51, of the sleeve 50 and of the cavity 48 of the shank 47 there are inserted two tubes, one inside the other, indicated by the numerals 52 and 53, and connected respectively to a cooling system and to a pressurized air blowing system.

In detail, the tube 53 (FIG. 29) is sealedly mounted on a centrally bored cylinder 54 received on the base of the cavity 48, and communicates with the conduits 49 via the hole in the cylinder 54. The other end of the tube is connected to said pressurized air delivery system, not shown being of usual type.

The tube 52 (FIG. 29) rests on an annular shoulder of the cavity. 48 and opens into a chamber 55 from which a plurality of radial conduits 56 branch to open on the outside of the shank 47. Said radial conduits specifically open into an annular interspace. 57 present between the inner surface of the sleeve 50 and the shank 47.

The upper end of the tube 52 is connected to a cooling system, not shown being of usual type.

On the tubular stem 51 there is mounted a fixed bush 84 supporting a spacer 15 and a spring 59. The spring 59 is mounted about the spacer 15 and acts against a disc 14 rigid with the tubular stem 51.

The bush 84 is mounted on the tubular stem 51 and is rigid with the turntable 2. The bush 84 carries a screwed tube 85, the lower edge of which rests on the annular shoulder of the sleeve 50 by virtue of the thrust of the spring 59.

On the sleeve 50 the is also mounted a closure and extraction ring 86 connected to an actuator 20 by a fork 21.

The extraction ring 86 is mounted in a collar 87 inserted into a hole present on the turntable 2. Friction and slide means 221 are positioned both between the ring 86 and said collar 87, and between the ring 86 and the sleeve 50.

The collar 87 presents an internal annular shoulder 870 on which there rests a guide cup 888 for a spring 89 positioned between said cup and a shoulder 840 of the bush 84.

The lower half-mould 83 comprises a fork-shaped member 88 movable in level by known means, not shown. The fork of the member 88 supports a shaft 890 carrying two dies 90 and 91, each of which presents an inner cavity indicated by the reference numerals 96 and 97.

To one end of the shaft 890 there is fixed a pinion 95 associated with drive means, not shown, enabling the shaft 890 to be rotated to bring the two dies in front of the punch 46 in succession.

In greater detail, the dies 90 and 91 are associated with the shaft by means of an interposed hollow cylinder 92, within said hollow cylinder 92, within said shaft 890 and within said fork member 88 there being present a plurality of mutually communicating conduits 93 and 94 which open in proximity to said dies and are connected at their other end to a usual respective die cooling system; according to the invention there is also provided a compressed air feed system, not shown, which facilitates the elimination of the vacuum effect which can be generated on the outside of the moulded product when opening the mould. The operation of the third embodiment of the invention consists of inserting a measured quantity of synthetic material into the cavity 96 of the die 90, then operating the means for varying the level of the member 88 in order to bring the edge of the die 90 against the edge of the closure and extraction ring to close the mould and define a first forming chamber. The member 88 is further raised to distribute the measured quantity within the forming chamber. During the raising of the member 88 the closure ring is raised until its upper edge comes into contact with the cup 888 guiding the spring 89, which hence commences to exert on said ring a force opposing the raising of the member 88.

Figure 30:
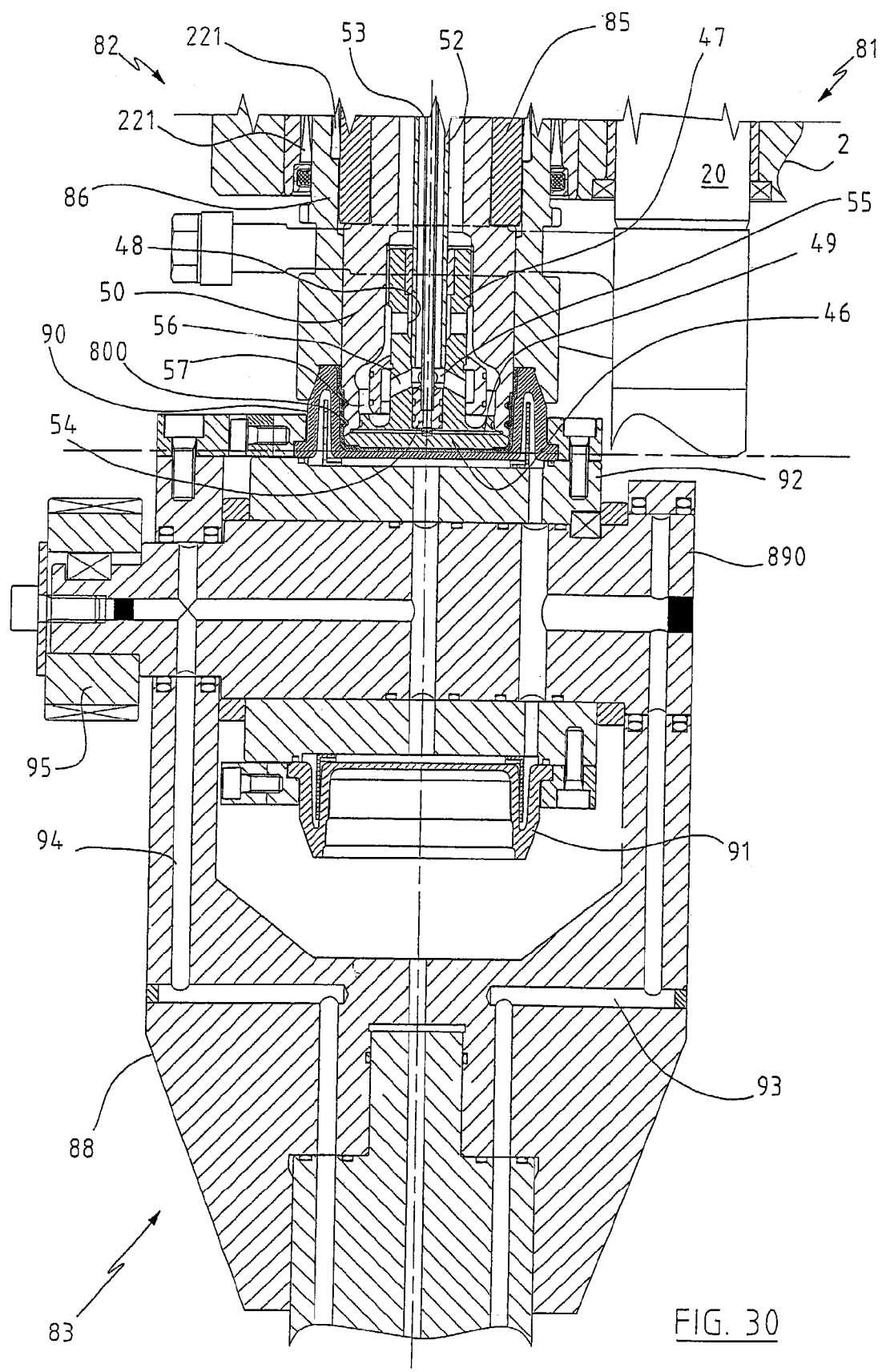
Figure 31:
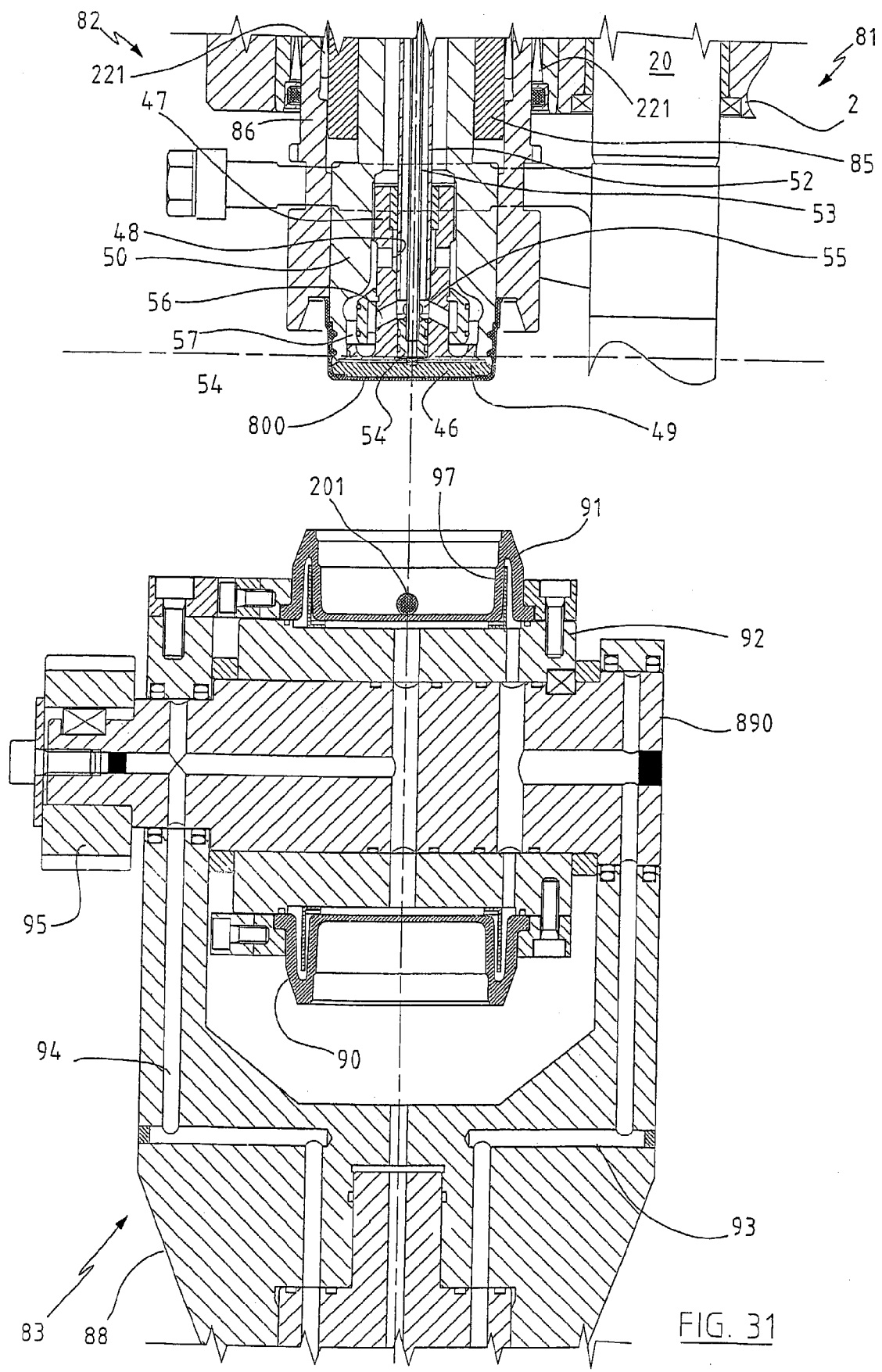
Figure 32:
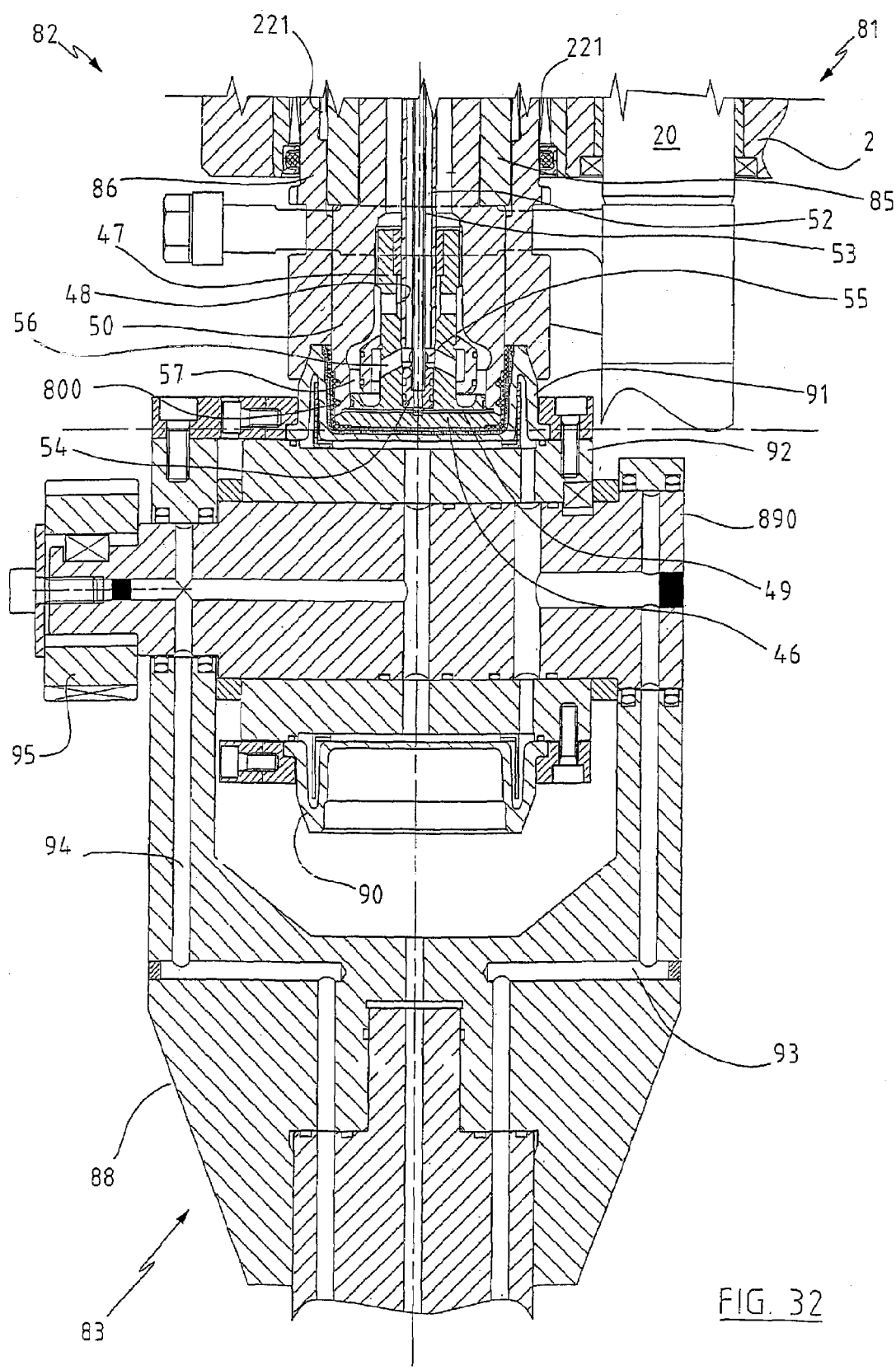
Figure 33:
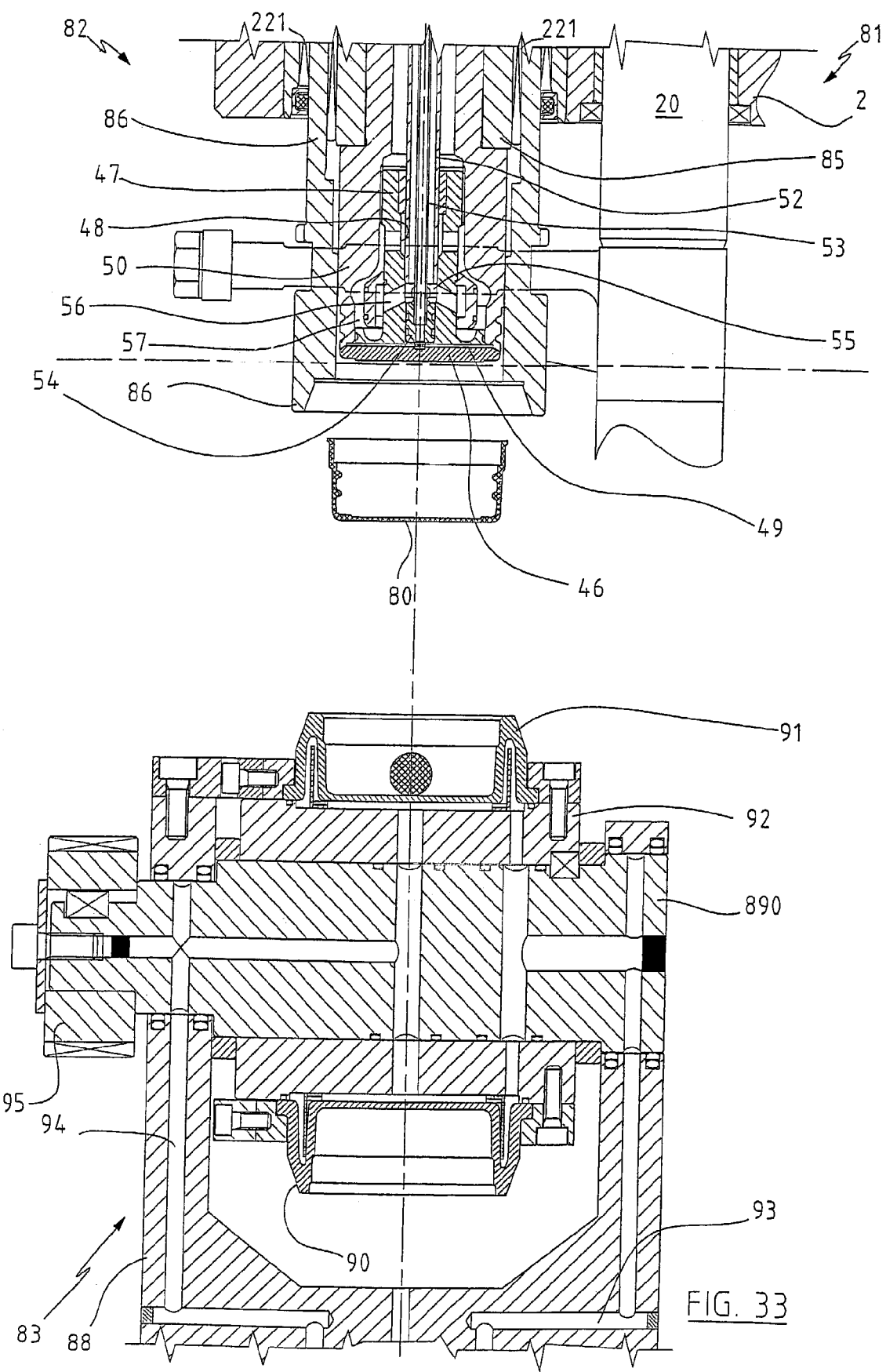

When the insert 800 has been formed (FIG. 30), the mould is opened, the insert remaining rigid with the upper half-mould because of the thread present in the insert.

Figure 34:
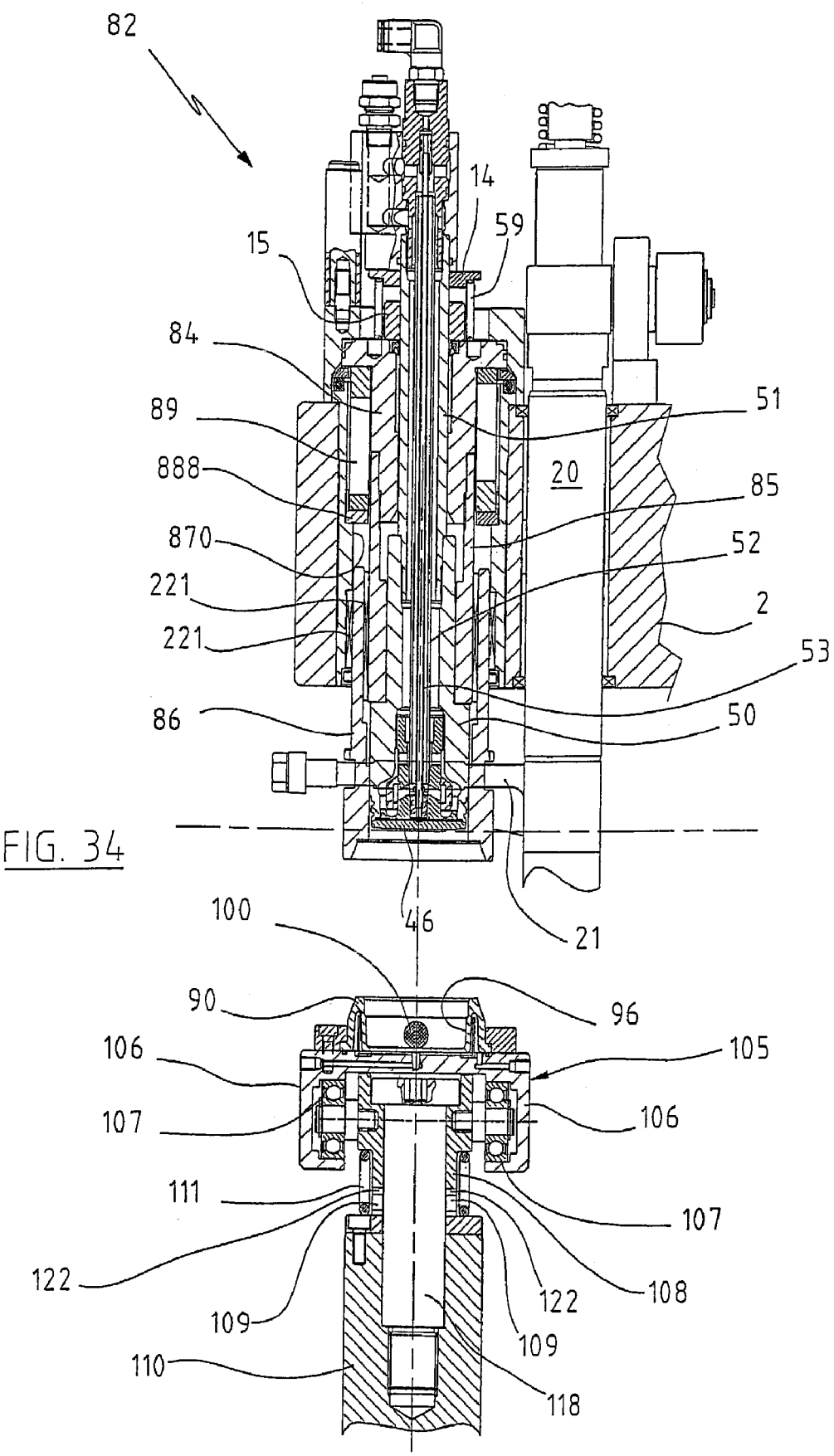
FIG. 34 shows a variant of the forming plant illustrated in FIGS. from 27 to 33.
Figure 35:
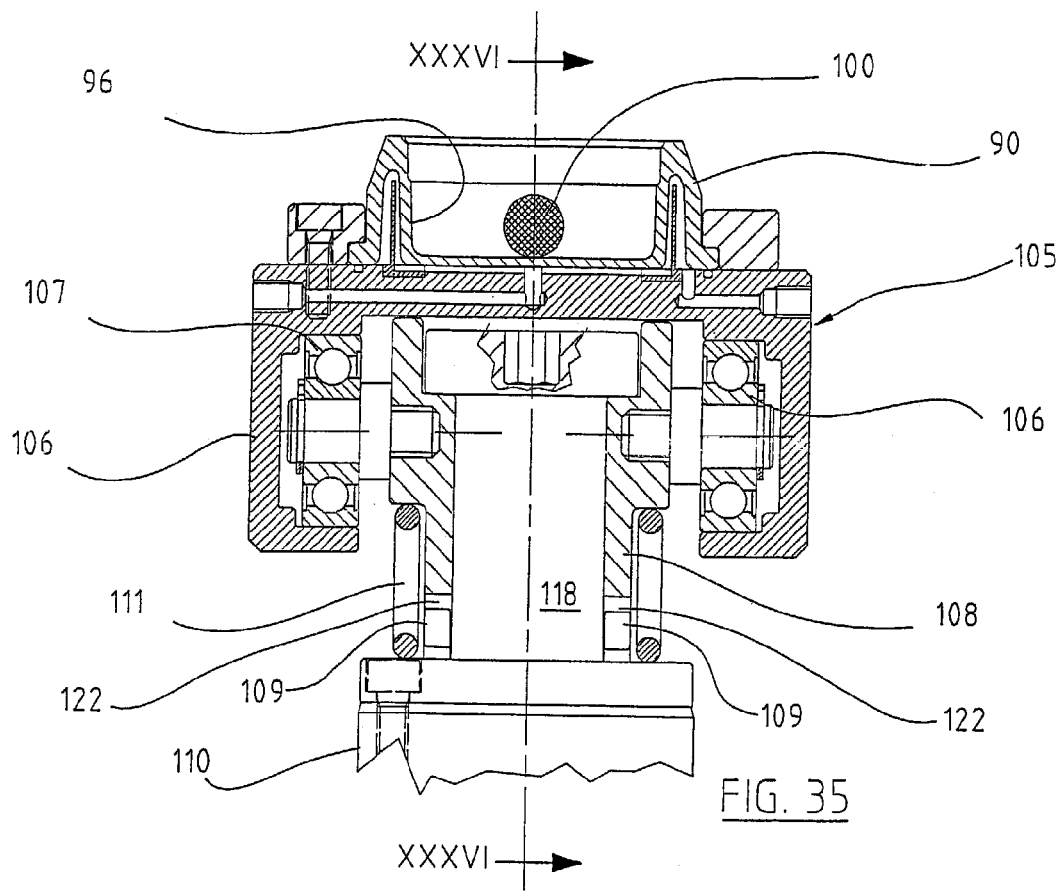
FIG. 35 is an enlarged view of the lower half-mould of FIG. 34.
Figure 36:
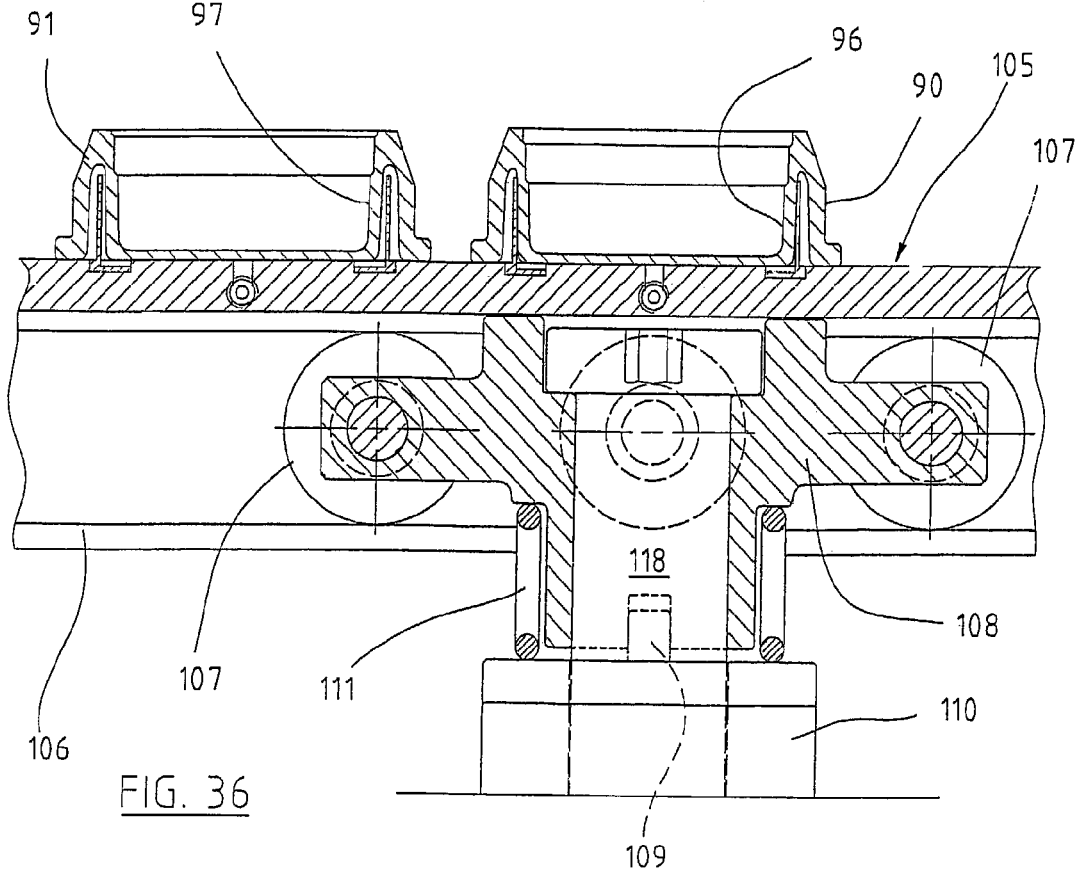
FIG. 36 is the section XXXVI through the lower half-mould used in the variant of FIG. 35.

At this point the shaft 89 is rotated to bring the die 91 below the punch 46, and a second measured quantity 201 of synthetic material is inserted into the cavity 97 of the die 91. The mould is then closed to define a second forming chamber. When the mould is closed the die is raised to form the outer covering 801 on top of the inner part 800 by compression. On termination of pressing, the mould is reopened and the linear actuator 20 is operated to cause the closure and extraction ring 86 to move downwards and extract the cap 80 from the punch. It should be noted that during this latter stage said compressed air delivery systems 53 are activated to inflate the cap from its interior in order to facilitate its detachment from the punch, to which it is connected by the thread. FIGS. 34, 35 and 36 show a first variant of the third embodiment of the invention, which differs with regard to the lower half-mould of the forming unit.

From said figures it can be seen that the lower half-mould comprises a slide 105 to which the dies 90 and 91 are fixed. The slide 105 comprises two opposing L-shaped lower guides 106 in which three pairs of bearings 107 are received to enable the slide 105 to be translated by means, not shown, in the direction radial to the axis of rotation of the turntable to bring the two dies below the punch 46 in succession.

With reference to FIG. 36, the bearings 107 are associated with a frame 108 provided with a central hole for receiving a pin 118 screwed to a support shank 110, there being interposed between the frame and the support shank a spring 111 mounted on a stem 109 branching centrally from the support shank 110.

The element 110 is associated with usual drive means, not shown, enabling the slide to translate vertically.

FIG. 35 also shows two ribs 109 which branch from the shank 110 and are received in two slots 122 of the frame 108; said ribs prevent rotation of the frame about the pin 118.

To operate of this variant of the invention, the die 90 is firstly positioned below the punch 46, a first measured quantity 100 is inserted into the die and the mould is closed by raising the slide 105. When the mould has been closed, pressing takes place in the manner described for the third embodiment of the invention, with the difference that after moulding the insert 800, the mould is reopened and the slide made to translate in order to bring the cavity 91, into which a second measured quantity of plastic material has been inserted, below the punch 46. At this point the mould is reclosed and the outer covering of the cap 801 is pressed.

It should be noted that the forces exerted during pressing are not supported by the bearings 107 but by the pin 108. In this respect, during pressing, the frame 108 translates relative to the pin 110, and the slide 105 rests on the upper surface of the pin 118.

Figure 37:
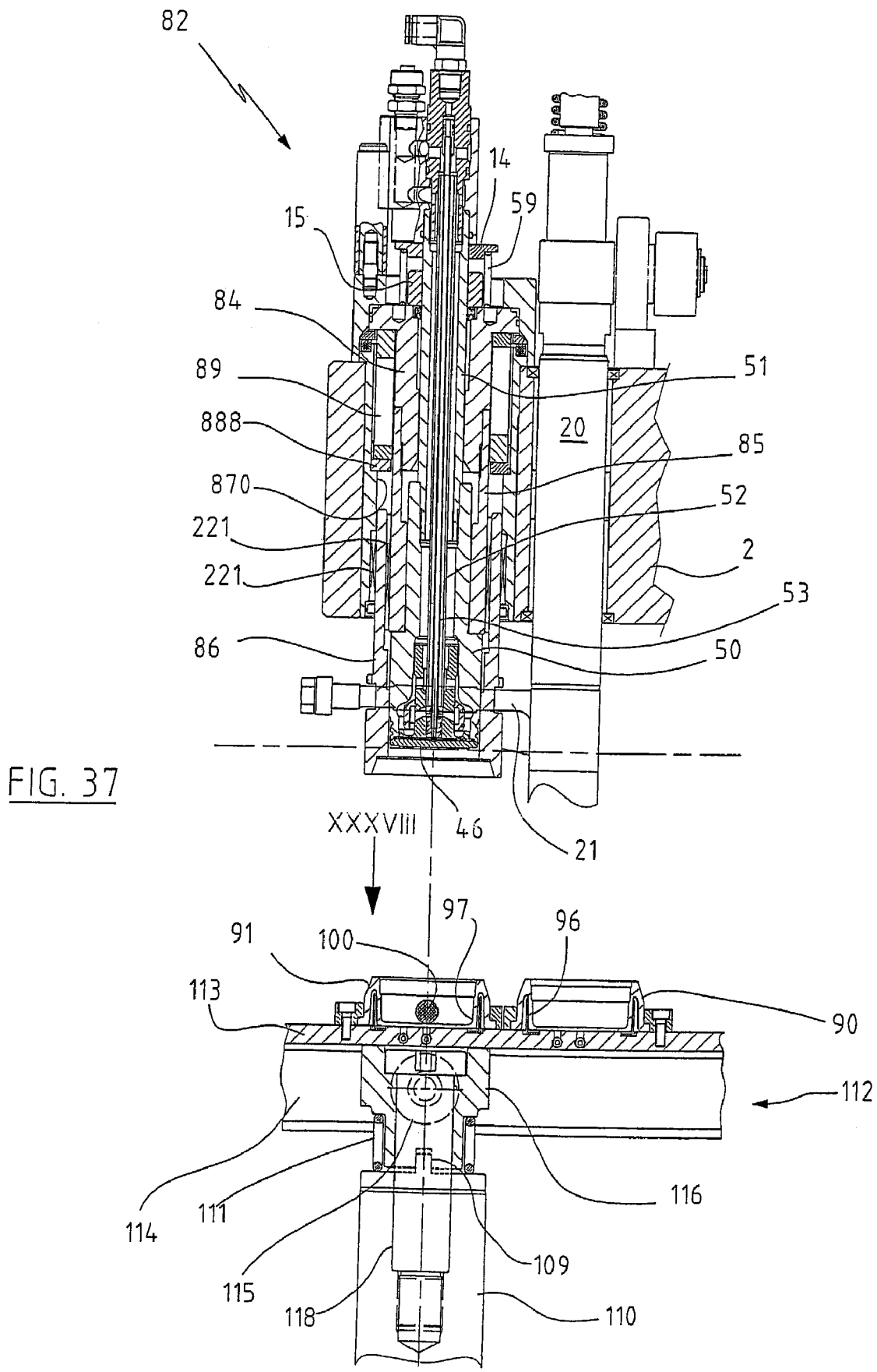
FIG. 37 shows a further variant of the invention.
Figure 38:
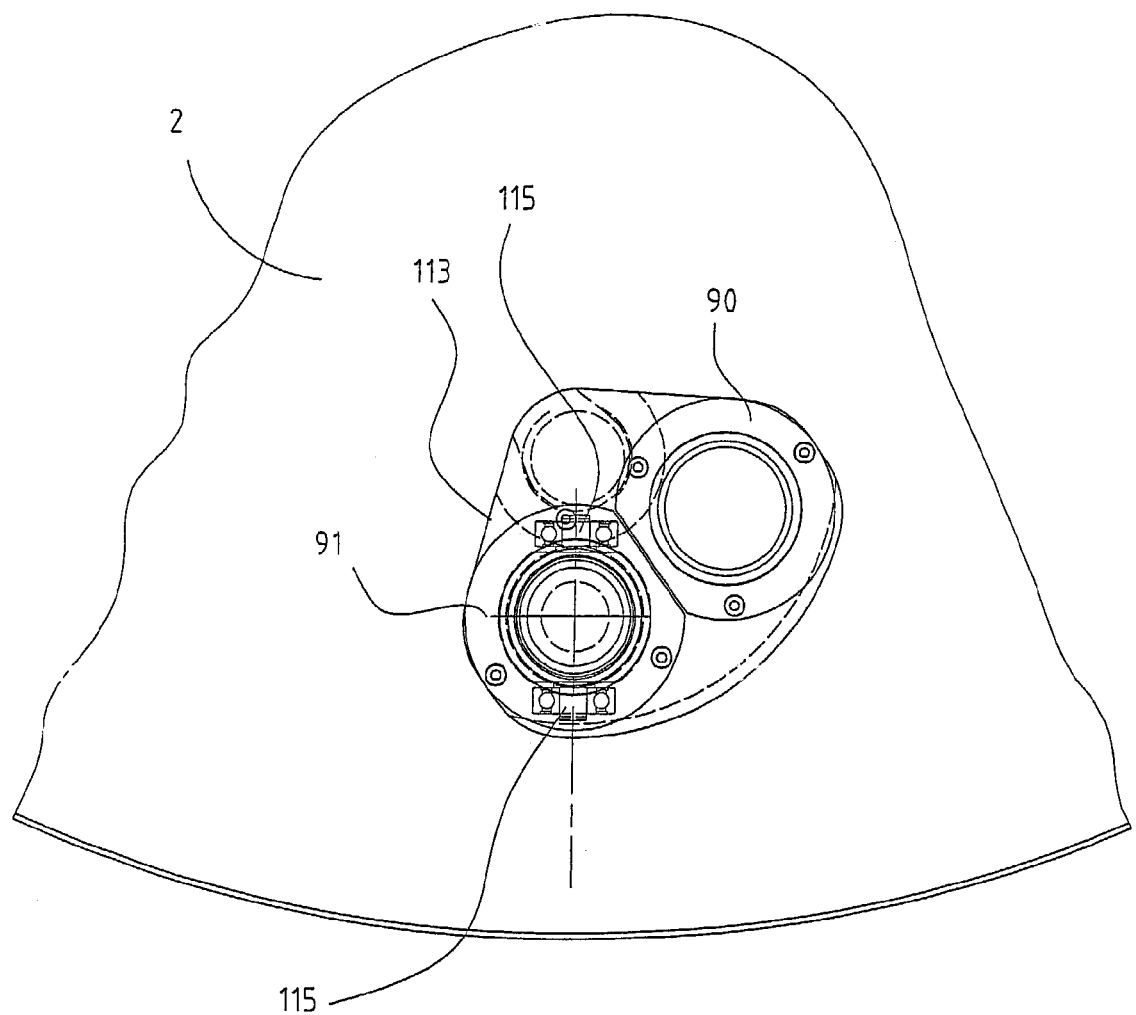
FIG. 38 is the view in the direction XXXVIII of FIG. 37.

FIGS. 37 and 38 show a further variant of the invention which differs from the described third embodiment with regard to the lower half-mould 112.

With reference to the figures it can be seen that the dies 90 and 91 are fixed to a plate 113 associated with the turntable 2 and rotatable relative thereto about an axis eccentric and parallel to the axis of rotation of the turntable.

Specifically the plate presents two lower circular guides 114 receiving a rolling bearing 115 associated with a support frame 116 provided with a central hole for receiving the pin 118 screwed to the support shank 110, the spring 111 being interposed between the frame and the support shank. The support pin is associated with drive means enabling it to translate vertically, these means not being shown being of known type. The operation of this variant of the invention is similar to the operation of the preceding variant, with the difference that in this case the dies are repositioned below the punch by rotating the plate 113.

The invention claimed is:

1. A method for forming an article of synthetic thermoplastic material by compression moulding, comprising at least the following operative stages:
    (a) inserting a first pellet of synthetic thermoplastic material in a plastic state into the first cavity of a mould having at least two cavities and comprising a punch suitable to be alternatively aligned with said cavities;
    (b) aligning said punch with the said first cavity with which it defines a first forming chamber for said first pellet;
    (c) pressing said pellet and cooling to obtain a first portion of the article, remaining rigid with the punch;
    (d) opening the mould and aligning said punch with a second cavity of the mould;
    (e) inserting a second pellet of synthetic material into said second cavity, the synthetic material of the second pellet being miscible with the synthetic thermoplastic material of the first pellet;
    (f) closing the mould by repositioning the punch relative to said second cavity to define a second forming chamber between the punch, having said first portion of the article rigid therewith, and said second mould cavity;
    (g) pressing said second pellet to form a second portion of the article; and
    (h) again opening the mould, and extracting said article from the punch.

2. A method as claimed in claim 1, characterised in that said second forming chamber is defined between the punch and said first portion of the article contained in the mould cavity.

3. A method as claimed in claim 1, characterised in that said first pellet and said second pellet consist of plastic materials which differ by at least one characteristic.

4. A method as claimed in claim 1, characterised in that said first pellet and said second pellet consist of identical materials.

5. A method as claimed in claim 1, characterised by repeating the steps (d) and (e) a number of times equal to the number of constituent portions of the product.

6. A method for forming an article of synthetic thermoplastic material by compression molding, comprising at least the following operative stages:
    a) inserting a first pellet of measured quantity of synthetic thermoplastic material in a plastic state into the first lower female half mould of a mould unit having at least two lower female half moulds and comprising an upper male half mould suitable to be alternatively aligned with said lower female half moulds;
    b) aligning said upper male half mould with the said first lower female half mould with which it defines a first forming chamber for said first pellet;
    c) pressing said first pellet to obtain a first portion of the article, remaining rigid with the upper male half mould,
    d) opening the mould while cooling and aligning said punch with a second female half mould
    e) inserting a second pellet of measured quantity of thermoplastic material into said second female half mould
    f) closing the mould by repositioning the upper male half mould relative to said second female half mould to define a second forming chamber between the upper male half mould, having said first portion of the article rigid therewith, and said second female half mould,
    g) pressing said second pellet,
    h) again opening the mould while cooling, and extracting said article from the upper male half mould,
    wherein said first and second pellets are made of miscible materials.

* * * * *